US012576613B2

(12) United States Patent
Ebrahimi et al.

(10) Patent No.: US 12,576,613 B2
(45) Date of Patent: Mar. 17, 2026

(54) MULTILAYER FILM STRUCTURE

(71) Applicant: Nova Chemicals (International) S.A., Fribourg (CH)

(72) Inventors: Marzieh Ebrahimi, Calgary (CA); Soheil Sadeghi, Calgary (CA); Patrick Lam, Calgary (CA); Vinod Konaganti, Calgary (CA); Norman Aubee, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 375 days.

(21) Appl. No.: 17/911,851

(22) PCT Filed: Mar. 5, 2021

(86) PCT No.: PCT/IB2021/051863
§ 371 (c)(1),
(2) Date: Sep. 15, 2022

(87) PCT Pub. No.: WO2021/186283
PCT Pub. Date: Sep. 23, 2021

(65) Prior Publication Data
US 2023/0130048 A1 Apr. 27, 2023

Related U.S. Application Data

(60) Provisional application No. 62/991,606, filed on Mar. 19, 2020.

(51) Int. Cl.
| | |
|---|---|
| *B32B 7/02* | (2019.01) |
| *B32B 27/08* | (2006.01) |
| *B32B 27/32* | (2006.01) |

(52) U.S. Cl.
CPC ............... *B32B 7/02* (2013.01); *B32B 27/08* (2013.01); *B32B 27/32* (2013.01);
(Continued)

(58) Field of Classification Search
CPC ............ B32B 7/02; B32B 27/32; B32B 27/08
(Continued)

(56) References Cited

U.S. PATENT DOCUMENTS

| | | |
|---|---|---|
| 5,206,075 A | 4/1993 | Hodgson, Jr. |
| 5,342,868 A | 8/1994 | Kimura et al. |

(Continued)

FOREIGN PATENT DOCUMENTS

| | | |
|---|---|---|
| EP | 2 081 990 B2 | 5/2019 |
| WO | WO-2009/012565 A1 | 1/2009 |

(Continued)

OTHER PUBLICATIONS

ASTMD1003-13—Standard Test Method for Haze and Luminous Transmittance of Transparent Plastics—Copyright ASTM International—Current edition approved Nov. 15, 2013. Published Nov. 2013. Originally approved in 1949. Last previous edition approved in 2011 as D1003-11. pp. 1-7.
(Continued)

*Primary Examiner* — Tahseen Khan
(74) *Attorney, Agent, or Firm* — Thomas J. Styslinger

(57) ABSTRACT

An all polyethylene multilayer film structure having alternating layers of (A) a linear low density polyethylene and (B) a high density polyethylene has improved performance properties relative to a film structure in which the (A) and (B) layers are arranged in a block like or random manner.

14 Claims, 2 Drawing Sheets

(52) U.S. Cl.
   CPC ..... *B32B 2250/05* (2013.01); *B32B 2250/242* (2013.01); *B32B 2250/40* (2013.01); *B32B 2307/72* (2013.01); *B32B 2553/00* (2013.01)

(58) Field of Classification Search
   USPC ........................................................ 428/218
   See application file for complete search history.

(56) References Cited

U.S. PATENT DOCUMENTS

| | | | |
|---|---|---|---|
| 5,376,439 | A | 12/1994 | Hodgson et al. |
| 5,981,636 | A | 11/1999 | Amos et al. |
| 6,465,551 | B1 | 10/2002 | Zhao et al. |
| 6,599,971 | B2 | 7/2003 | Dotson et al. |
| 8,709,611 | B2 | 4/2014 | Haley |
| 9,512,282 | B2 | 12/2016 | Li et al. |
| 2006/0047078 | A1 | 3/2006 | Swabey et al. |
| 2008/0118749 | A1 | 5/2008 | Aubee et al. |
| 2009/0029182 | A1* | 1/2009 | Aubee .................... C08L 23/06 |
| | | | 428/500 |
| 2011/0300391 | A1 | 12/2011 | Haley |
| 2013/0225743 | A1 | 8/2013 | Aubee et al. |
| 2015/0203671 | A1 | 7/2015 | Aubee et al. |
| 2017/0002186 | A1 | 1/2017 | Aubee et al. |
| 2017/0130040 | A1 | 5/2017 | Aubee et al. |

FOREIGN PATENT DOCUMENTS

| | | | | |
|---|---|---|---|---|
| WO | WO-2010/046098 | A1 | 4/2010 | |
| WO | WO-2011/050042 | A1 | 4/2011 | |
| WO | WO-2015/042561 | A1 | 3/2015 | |
| WO | WO-2015/042562 | A1 | 3/2015 | |
| WO | WO-2015/042563 | A1 | 3/2015 | |
| WO | WO-2016/097951 | A1 | 6/2016 | |
| WO | WO-2017097573 | A1 * | 6/2017 | ............ B32B 27/08 |
| WO | WO-2020/229932 | A1 | 11/2020 | |
| WO | WO-2020/247581 | A1 | 12/2020 | |

OTHER PUBLICATIONS

ASTM D1238-13—Standard Test Method for Melt Flow Rates of Thermoplastics by Extrusion Plastometer—Copyright ASTM International—Current edition approved Aug. 1, 2013. Published Aug. 2013. Originally approved in 1965. Last previous edition approved in 2010 as D1238-10. pp. 1-16.

ASTM D1709-09—Standard Test Method for Impact Resistance of Plastic Film by the Free-Falling Dart Method—Copyright ASTM International—Current edition approved May 1, 2009. Published Jun. 2009. Originally approved in 1959. Last previous edition approved in 2008 as D1709-08. pp. 1-9.

ASTM D2457-13—Standard Test Method for Specular Gloss of Plastic Films and Solid Plastics—Copyright ASTM International—Current edition approved Apr. 1, 2013. Published Apr. 2013. Originally approved in 1965. Last previous edition approved in 2008 as D2457-08. pp. 1-6.

ASTM D5748-95—Standard Test Method for Protrusion Puncture Resistance of Stretch Wrap Film—Copyright ASTM International—Current edition approved Apr. 1, 2012. Published May 2012. Originally approved in 1995. Last previous edition approved in 2007 as D5748-97. pp. 1-4.

ASTM D6474-12—Standard Test Method for Determining Molecular Weight Distribution and Molecular Weight Averages of Polyolefins by High Temperature Gel Permeation Chromatography—Copyright ASTM International—Current edition approved Dec. 15, 2012. Published Dec. 2012. Originally approved in 1999. Last previous edition approved in 2006 as D6474-99. pp. 1-6.

ASTM D790-10—Standard Test Methods for Flexural Properties of Unreinforced and Reinforced Plastics and Electrical Insulating Materials—Copyright ASTM International—Current edition approved Apr. 1, 2010. Published Apr. 2010. Originally approved in 1970. Last previous edition approved in 2007 as D790-07. pp. 1-11.

ASTM D792-13—Standard Test Method for Density and Specific Gravity (Relative Density) of Plastics by Displacement—Copyright ASTM International—Current edition approved Nov. 1, 2013. Published Nov. 2013. Originally approved in 1944. Last previous edition approved in 2008 as D792-08. pp. 1-6.

ASTM D882-12—Standard Test Method for Tensile Properties of Thin Plastic Sheeting—Copyright ASTM International—Current edition approved Aug. 1, 2012. Published Sep. 2012. Originally approved in 1946. Last previous edition approved in 2010 as D882-10. pp. 1-11.

ASTM F1249-90—Standard Test Method for Water Vapor Transmission Rate Through Plastic Film and Sheeting Using a Modulated Infrared Sensor—Copyright ASTM International—Current edition approved Jul. 27, 1990. Published Sep. 1990. Originally published as F1249-89. Last previous edition F1249-89. pp. 1-5.

Wild et al., "Determination of Branching Distributions in Polyethylene and Ethylene Copolymers", J. Polym. Sci., Part B, Polym. Phys., vol. 20 (3), pp. 441-455.

* cited by examiner

MULTILAYER FILM STRUCTURE

CROSS-REFERENCE TO RELATED APPLICATIONS

This application is a U.S. National Phase Application under 35 U.S.C. § 371 of International Application No. PCT/IB2021/051863, filed Mar. 5, 2021, which claims priority to and the benefit of U.S. Provisional Application No. 62/991,606, filed Mar. 19, 2020, both of which are hereby incorporated by reference in their entireties.

TECHNICAL FIELD

Provided are all polyethylene film structures having alternating and adjacent layers of (A) a linear low density polyethylene and (B) a high density polyethylene. The film structures have relatively good toughness, optical properties and curl properties at a given stiffness.

BACKGROUND ART

In multilayer film structures, each film layer may contribute its own characteristic property or properties to end-use performance, such as gas or water vapor barrier properties, sealability, toughness, stiffness and mechanical strength. However, in addition to the properties attributed to the presence of an individual layer, the final performance properties of a multilayer film structure may be a function of the interfacial compatibility and adhesion interface between adjacent film layers.

SUMMARY OF INVENTION

Without wishing to be bound by any single theory, in a multilayer film structure comprising layers of semi-crystalline polymeric materials, the interlayer adhesion may be improved by promoting co-crystallization across the interfaces between layers thereby forming a homogenous lattice of interfacial crystals.

We now report that the performance properties of an all polyethylene multilayer film structure are improved with the appropriate arrangement and type of polyethylene materials in the film structure.

Provided is an all polyethylene multilayer film structure, the film structure comprising at least five alternating and adjacent layers of:

(A) a linear low density polyethylene having a density of from 0.910 g/cm³ to 0.940 g/cm³ and a melt index, $I_2$ of from 0.1 to 10 g/10 min; and (B) a high density polyethylene having a density of at least 0.945 g/cm³, a melt index, $I_2$ of from 0.1 to 10 g/10 min and comprising from 0 to 1 weight percent of a nucleating agent or a mixture of nucleating agents.

In an embodiment, the difference in density between the linear low density polyethylene (A) and the high density polyethylene (B) is at least 0.015 g/cm³.

In an embodiment, the difference in density between the linear low density polyethylene (A) and the high density polyethylene (B) is at least 0.030 g/cm³.

In an embodiment, the high density polyethylene is a polyethylene homopolymer composition, the polyethylene homopolymer composition comprising:

(i) 95 to 30 weight percent of a first ethylene homopolymer having a density of from 0.950 to 0.975 g/cm³; and (ii) 5 to 70 weight percent of a second ethylene homopolymer having a density of from 0.950 to 0.975 g/cm³, wherein the ratio of the melt index, $I_2$ of the second ethylene homopolymer to the melt index, $I_2$ of the first ethylene homopolymer is at least 10.

In an embodiment, the high density polyethylene comprises from 100 to 10,000 ppm of a nucleating agent or a mixture of nucleating agents.

In an embodiment, the nucleating agent or the mixture of nucleating agents comprises a salt of a dicarboxylic acid compound.

In an embodiment, the film structure has five alternating and adjacent layers in the following pattern: A/B/A/B/A.

In an embodiment, the film structure has five alternating and adjacent layers in the following pattern: B/A/B/A/B.

In an embodiment, the film structure has seven alternating and adjacent layers in the following pattern: A/B/A/B/A/B/A.

In an embodiment, the film structure has seven alternating and adjacent layers in the following pattern: B/A/B/A/B/A/B.

In an embodiment, the film structure has nine alternating and adjacent layers in the following pattern: A/B/A/B/A/B/A/B/A.

In an embodiment, the film structure has nine alternating and adjacent layers in the following pattern: B/A/B/A/B/A/B/A/B.

In an embodiment, the film structure has eleven alternating and adjacent layers in the following pattern: A/B/A/B/A/B/A/B/A/B/A.

In an embodiment, the film structure has eleven alternating and adjacent layers in the following pattern: B/A/B/A/B/A/B/A/B/A/B.

In an embodiment of the disclosure a film structure has at least one skin layer comprising (A) a linear low density polyethylene having a density of from 0.910 g/cm³ to 0.940 g/cm³ and a melt index, $I_2$ of from 0.1 to 10 g/10 min.

DESCRIPTION OF EMBODIMENTS

Figure 1:
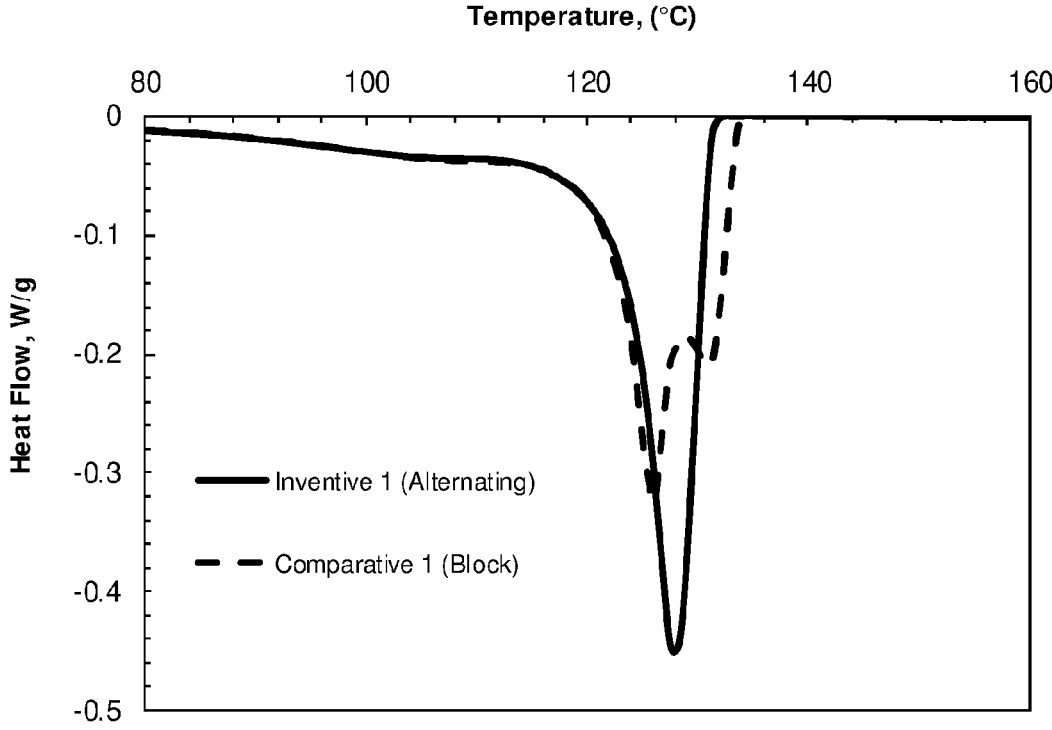
FIG. 1 shows the modulated differential scanning calorimetry analysis (MDSC), specifically the second heating total heat flow, for a film structure which is an embodiment of the disclosure as well as for a comparative film structure.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values.

As used herein, the term "monomer" refers to a small molecule that may chemically react and become chemically bonded with itself or other monomers to form a polymer.

As used herein, the term "α-olefin" is used to describe a monomer having a linear hydrocarbon chain containing from 3 to 20 carbon atoms having a double bond at one end of the chain; an equivalent term is "linear α-olefin".

By the terms "ethylene homopolymer" or "polyethylene homopolymer" which are used interchangeably, it is meant that polymer being referred to is the product of a polymerization process, in which only ethylene was deliberately added or present as a polymerizable monomer.

By the terms "ethylene copolymer" or "polyethylene copolymer" which are used interchangeably, it is meant that the polymer being referred to is the product of a polymerization process, in which ethylene and one or more than one α-olefin were deliberately added or were deliberately present as a polymerizable monomer.

In an embodiment of the present disclosure, a film structure comprises alternating and adjacent layers of two different polyethylene polymers: (A) a linear low density polyethylene and (B) a high density polyethylene. Accordingly, in an embodiment, the film structure of the present disclosure will be an all polyethylene film structure and it will be a multilayer film structure.

The Linear Low Density Polyethylene

In an embodiment of the present disclosure a "linear low density polyethylene" is an ethylene copolymer of ethylene and one or more than one α-olefin.

In embodiments of the disclosure, a linear low density polyethylene is an ethylene copolymer of ethylene and one or more than one $C_3$-$C_{20}$ alpha olefins and/or $C_4$-$C_{18}$ diolefins.

In embodiments of the disclosure, a linear low density polyethylene is an ethylene copolymer of ethylene and one or more than one of propylene, 1-butene, 1-hexene, 4-methyl-1-pentene and 1-octene.

In an embodiment of the disclosure, a linear low density polyethylene is an ethylene copolymer of ethylene and 1-octene.

In embodiments of the disclosure, a linear low density polyethylene is an ethylene copolymer of ethylene and one or more than one $C_3$-$C_{20}$ alpha olefins and comprises at least 70 weight percent of ethylene, or at least 80 weight percent of ethylene, or at least 90 weight percent of ethylene.

In embodiments of the disclosure, a linear low density polyethylene is an ethylene copolymer of ethylene and 1-octene and comprises at least 70 weight percent of ethylene, or at least 80 weight percent of ethylene, or at least 90 weight percent of ethylene.

In embodiments of the disclosure, a linear low density polyethylene has a density of from 0.910 to 0.940 g/cm³, or from 0.910 to 0.939 g/cm³, or from 0.910 to 0.936 g/cm³, or from 0.910 to 0.932 g/cm³, or from 0.912 to 0.940 g/cm³, or from 0.912 to 0.939 g/cm³, or from 0.912 to 0.936 g/cm³, or from 0.912 to 0.932 g/cm³, or from 0.914 to 0.930 g/cm³, or from 0.914 to 0.939 g/cm³, or from 0.914 to 0.936 g/cm³, or from 0.914 to 0.932 g/cm³, or from 0.916 to 0.940 g/cm³, or from 0.916 to 0.939 g/cm³, or from 0.916 to 0.936 g/cm³, or from 0.916 to 0.932 g/cm³, or from 0.910 to 0.930 g/cm³, or from 0.910 to 0.928 g/cm³, or from 0.910 to 0.926 g/cm³, or from 0.910 to 0.924 g/cm³, or from 0.912 to 0.930 g/cm³, or from 0.912 to 0.928 g/cm³, or from 0.912 to 0.926 g/cm³, or from 0.912 to 0.924 g/cm³, or from 0.914 to 0.930 g/cm³, or from 0.914 to 0.928 g/cm³, or from 0.914 to 0.926 g/cm³, or from 0.914 to 0.924 g/cm³.

In embodiments of the disclosure, a linear low density polyethylene has a melt index, $I_2$ of from 0.01 to 100 g/10 min, or from 0.1 to 50 g/10 min, or from 0.1 to 10 g/10 min, or from 0.1 to 5 g/10 min, or from 0.5 to 5 g/10 min, or from 0.1 to 3 g/10 min, or from 0.5 to 3 g/10 min.

In embodiments, the linear low density polyethylene of the current disclosure can be a homogeneous ethylene copolymer or heterogeneous ethylene copolymer.

The term "homogeneous ethylene copolymer" refers to a subset of ethylene copolymers that are produced using a homogeneous catalyst formulation. Homogeneous catalysts are single site catalysts, non-limiting examples of which include metallocene catalysts, constrained geometry catalysts and phosphinimine catalysts, all of which are well known to persons skilled in the art.

The term "heterogeneous ethylene copolymer" refers to a subset of ethylene copolymers that are produced using a heterogeneous catalyst formulation. Heterogeneous catalysts are multi-site catalysts, non-limiting examples of which include Ziegler-Natta catalysts or chromium catalysts, both of which are well known to persons skilled in the art.

Typically, homogeneous ethylene copolymers have a narrow molecular weight distribution, such as for example a gel permeation chromatography (GPC) $M_w/M_n$ value of less than about 2.8; where $M_w$ and $M_n$ refer to weight and number average molecular weights, respectively. In contrast, the $M_w/M_n$ of heterogeneous ethylene copolymers are typically greater than the $M_w/M_n$ of homogeneous ethylene copolymers. In general, homogeneously ethylene copolymers also have a narrow comonomer distribution, i.e. each macromolecule within the molecular weight distribution has a similar comonomer content. Frequently, the composition distribution breadth index "CDBI" is used to quantify how the comonomer is distributed within an ethylene copolymer, as well as to differentiate ethylene copolymers produced with different catalysts or processes. The "$CDBI_{50}$" is defined as the percent of ethylene copolymer whose composition is within 50% of the median comonomer composition and this definition is consistent with that described in U.S. Pat. No. 5,206,075 assigned to Exxon Chemical Patents Inc. The CDB150 of an ethylene copolymer can be calculated from TREF curves (Temperature Rising Elution Fractionation); the TREF method is described in Wild, et al., J. Polym. Sci., Part B, Polym. Phys., Vol. 20 (3), pages 441-455. Typically, the $CDBI_{50}$ of homogeneous ethylene copolymers are greater than about 70%. In contrast, the $CDBI_{50}$ of heterogeneous ethylene copolymers are generally lower than the $CDBI_{50}$ of homogeneous ethylene copolymers.

It is well known to those skilled in the art, that homogeneous ethylene copolymers are frequently further subdivided into "linear homogeneous ethylene copolymers" and "substantially linear homogeneous ethylene copolymers". These two subgroups differ in the amount of long chain branching present. More specifically, linear homogeneous ethylene copolymers have less than about 0.01 long chain branches per 1000 carbon atoms, while substantially linear ethylene copolymers have greater than about 0.01 to about 3.0 long chain branches per 1000 carbon atoms. A long chain branch is macromolecular in nature (i.e. may be similar in length to the macromolecule that the long chain branch is attached to). In this disclosure, the term "homogeneous ethylene copolymer" refers to both linear homogeneous ethylene copolymers and substantially linear homogeneous ethylene copolymers.

In embodiments of the disclosure, the linear low density polyethylene can be unimodal or multimodal.

As used herein, the term "unimodal" refers to the molecular weight distribution (the MWD) in a gel permeation chromatography (GPC) curve and which does not substantially exhibit multiple component polymers (i.e., no humps, shoulders or tails exist or are substantially discernible in the GPC curve). As used herein, "multimodal" refers to the MWD in a GPC curve and which exhibits two or more component polymers, wherein one component polymer may even exist as a hump, shoulder or tail relative to the MWD of the other component polymer.

In embodiments of the disclosure, the linear low density polyethylene has a molecular weight distribution, Mw/Mn of less than 10.0, or less than 9.0, or less than 7.0, or less than 6.0, or less than 5.5, or less than 5.0, or less than 4.5, or less than 4.0, or less than 3.8. In some embodiments of the disclosure, the linear low density polyethylene has a Mw/Mn ratio of from 2.0 to 10.0, or from 2.0 to 8.0, or from 2.0 to 6.0, or from 2.0 to 5.5, or from 2.0 to 5.0, or from 2.0 to 4.5, or from 2.0 to 4.0, or from 2.2 to 6.0, or from 2.2 to 5.5, or from 2.2 to 5.0, or from 2.2 to 4.5, or from 2.2 to 4.0, or from 2.5 to 6.0, or from 2.5 to 5.5, or from 2.5 to 5.0, or from 2.5 to 4.5, or from 2.5 to 4.0. In still further embodiments of the disclosure, the linear low density polyethylene has a Mw/Mn ratio of from 3.0 to 5.5, or from 3.0 to 4.5, or from 3.0 to 4.0, or from 3.2 to 5.5, or from 3.2 to 5.0, or from 3.2 to 4.5.

In embodiments of the disclosure, the linear low density polyethylene has a Z-average molecular weight distribution, Mz/Mw of from 1.5 to 6.0. In further embodiments of the disclosure, the linear low density polyethylene has a Mz/Mn of from 1.5 to 5.5, or from 1.5 to 5.0, or from 1.5 to 4.0, or from 1.5 to 3.5, or from 1.5 to 3.0, or from 1.5 to 2.5.

In embodiments of the disclosure, the linear low density polyethylene can be made using a gas-phase, a solution-phase, or a slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof.

In an embodiment of the disclosure, the linear low density polyethylene is made in a solution phase polymerization process.

In an embodiment of the disclosure, the linear low density polyethylene is a heterogeneous ethylene copolymer.

In an embodiment of the disclosure, the linear low density polyethylene is made with a heterogeneous catalyst formulation.

In an embodiment of the disclosure, the linear low density polyethylene is made with a Ziegler-Natta catalyst formulation.

In an embodiment of the disclosure, the linear low density polyethylene is made with a heterogeneous catalyst formulation in a solution phase polymerization process.

In an embodiment of the disclosure, the linear low density polyethylene is made with a Ziegler-Natta catalyst formulation in a solution phase polymerization process.

A number of heterogeneous catalyst formulations are well known to those skilled in the art, including, as non-limiting examples, Ziegler-Natta and chromium catalyst formulations.

In an embodiment of the disclosure a heterogeneous catalyst formulation is a Ziegler-Natta catalyst.

Ziegler-Natta catalysts include in-line and batch Ziegler-Natta catalyst formulations. The term "in-line Ziegler-Natta catalyst formulation" refers to the continuous synthesis of a small quantity of active Ziegler-Natta catalyst and immediately injecting this catalyst into at least one continuously operating reactor, where the catalyst polymerizes ethylene and one or more optional α-olefins to form an ethylene interpolymer. The terms "batch Ziegler-Natta catalyst formulation" or "batch Ziegler-Natta procatalyst" refer to the synthesis of a much larger quantity of catalyst or procatalyst in one or more mixing vessels that are external to, or isolated from, the continuously operating solution polymerization process. Once prepared, the batch Ziegler-Natta catalyst formulation, or batch Ziegler-Natta procatalyst, is transferred to a catalyst storage tank. The term "procatalyst"

refers to an inactive catalyst formulation (inactive with respect to ethylene polymerization); the procatalyst is converted into an active catalyst by adding an alkyl aluminum co-catalyst. As needed, the procatalyst is pumped from the storage tank to at least one continuously operating reactor, where an active catalyst is formed and polymerizes ethylene and one or more optional α-olefins to form an ethylene interpolymer. The procatalyst may be converted into an active catalyst in the reactor or external to the reactor.

A wide variety of chemical compounds can be used to synthesize an active Ziegler-Natta catalyst formulation. The following describes various chemical compounds that may be combined to produce an active Ziegler-Natta catalyst formulation. Those skilled in the art will understand that the embodiments in this disclosure are not limited to the specific chemical compound disclosed.

An active Ziegler-Natta catalyst formulation may be formed from: a magnesium compound, a chloride compound, a metal compound, an alkyl aluminum co-catalyst and an aluminum alkyl. As will be appreciated by those skilled in the art, Ziegler-Natta catalyst formulations may contain additional components; a non-limiting example of an additional component is an electron donor, e.g. amines or ethers.

A non-limiting example of an active in-line Ziegler-Natta catalyst formulation can be prepared as follows. In the first step, a solution of a magnesium compound (component (v)) is reacted with a solution of the chloride compound (component (vi)) to form a magnesium chloride support suspended in solution. Non-limiting examples of magnesium compounds include $Mg(R^1)_2$; wherein the $R^1$ groups may be the same or different, linear, branched or cyclic hydrocarbyl radicals containing 1 to 10 carbon atoms. Non-limiting examples of chloride compounds include $R^2Cl$; wherein $R^2$ represents a hydrogen atom, or a linear, branched or cyclic hydrocarbyl radical containing 1 to 10 carbon atoms. In the first step, the solution of magnesium compound may also contain an aluminum alkyl (component (ix)). Non-limiting examples of aluminum alkyl include $Al(R^3)_3$, wherein the $R^3$ groups may be the same or different, linear, branched or cyclic hydrocarbyl radicals containing from 1 to 10 carbon atoms. In the second step a solution of the metal compound (component (vii)) is added to the solution of magnesium chloride and the metal compound is supported on the magnesium chloride. Non-limiting examples of suitable metal compounds include $M(X)_n$ or $MO(X)_n$; where M represents a metal selected from Group 4 through Group 8 of the Periodic Table, or mixtures of metals selected from Group 4 through Group 8; O represents oxygen, and; X represents chloride or bromide; n is an integer from 3 to 6 that satisfies the oxidation state of the metal. Additional non-limiting examples of suitable metal compounds include Group 4 to Group 8 metal alkyls, metal alkoxides (which may be prepared by reacting a metal alkyl with an alcohol) and mixed-ligand metal compounds that contain a mixture of halide, alkyl and alkoxide ligands. In the third step a solution of an alkyl aluminum co-catalyst (component (viii)) is added to the metal compound supported on the magnesium chloride. A wide variety of alkyl aluminum co-catalysts are suitable, as expressed by formula (VI):

$$Al(R^4)_p(OR^5)_q(X)_r \qquad \text{(VI)}$$

wherein the $R^4$ groups may be the same or different, hydrocarbyl groups having from 1 to 10 carbon atoms; the $OR^5$ groups may be the same or different, alkoxy or aryloxy groups wherein $R^5$ is a hydrocarbyl group having from 1 to 10 carbon atoms bonded to oxygen; X is chloride or bromide; and (p+q+r)=3, with the proviso that p is greater than 0. Non-limiting examples of commonly used alkyl aluminum co-catalysts include trimethyl aluminum, triethyl aluminum, tributyl aluminum, dimethyl aluminum methoxide, diethyl aluminum ethoxide, dibutyl aluminum butoxide, dimethyl aluminum chloride or bromide, diethyl aluminum chloride or bromide, dibutyl aluminum chloride or bromide and ethyl aluminum dichloride or dibromide.

The process described in the paragraph above, to synthesize an active in-line Ziegler-Natta catalyst formulation, can be carried out in a variety of solvents; non-limiting examples of solvents include linear or branched $C_5$ to $C_{12}$ alkanes or mixtures thereof.

To produce an active in-line Ziegler-Natta catalyst formulation in an embodiment of the disclosure the quantity and mole ratios of the five components, (v) through (ix), are optimized as described in U.S. Pat. No. 9,512,282.

Additional embodiments of heterogeneous catalyst formulations include formulations where the "metal compound" is a chromium compound; non-limiting examples include silyl chromate, chromium oxide and chromocene. In some embodiments, the chromium compound is supported on a metal oxide such as silica or alumina. Heterogeneous catalyst formulations containing chromium may also include co-catalysts; non-limiting examples of co-catalysts include trialkylaluminum, alkylaluminoxane and dialkoxyalkylaluminum compounds and the like.

In embodiments of the disclosure, the linear low density polyethylene may contain conventional type additives, including (1) primary antioxidants (such as for example, hindered phenols, including vitamin E); (2) secondary antioxidants (such as for example, phosphites and phosphonites); and (3) process aids (such as for example, fluoroelastomer and/or polyethylene glycol bound process aid).

Still other additives that may be added to the linear low density polyethylene in embodiments of the disclosure include nitrones, antacids, UV absorbers, metal deactivators, pigments, dyes, fillers and reinforcing agents, nano-scale organic or inorganic materials, antistatic agents, lubricating agents such as calcium stearates, and slip additives such as erucimide and behenamide.

The High Density Polyethylene

In embodiments of the disclosure, a high density polyethylene can be an ethylene homopolymer or an ethylene copolymer.

In embodiments of the disclosure, a high density polyethylene is an ethylene copolymer of ethylene and one or more than one $C_3$-$C_{20}$ alpha olefins and/or $C_4$-$C_{18}$ diolefins.

In embodiments of the disclosure, suitable α-olefins for polymerization with ethylene to make a high density polyethylene include α-olefins such as but not limited to propylene, 1-butene, 1-pentene, 1-hexene and 1-octene.

In embodiments of the disclosure, a high density polyethylene is an ethylene copolymer of ethylene and one or more than one of propylene, 1-butene, 1-hexene, 4-methyl-1-pentene and 1-octene.

In an embodiment of the disclosure, a high density polyethylene is an ethylene copolymer of ethylene and 1-octene.

In embodiments of the disclosure, a high density polyethylene is an ethylene homopolymer.

In embodiments of the disclosure, a high density polyethylene has a density of greater than 0.940 g/cm³, or at least 0.941 g/cm³, or at least 0.945 g/cm³, or at least 0.949 g/cm³, or at least 0.950 g/cm³, or at least 0.955 g/cm³, or at least 0.960 g/cm³, or at least 0.965 g/cm³.

In embodiments of the disclosure, a high density polyethylene has a density of from 0.945 to 0.975 g/cm³, or from 0.945 to 0.970 g/cm³, or from 0.945 to 0.967 g/cm³, or from 0.949 to 0.975 g/cm³, or from 0.949 to 0.970 g/cm³, or from 0.949 to 0.967 g/cm³, or from 0.950 to 0.975 g/cm³, or from 0.950 to 0.970 g/cm³, or from 0.950 to 0.967 g/cm³, or from 0.955 to 0.975 g/cm³, or from 0.955 to 0.970 g/cm³, or from 0.955 to 0.967 g/cm³, or from 0.960 to 0.975 g/cm³, or from 0.960 to 0.970 g/cm³, or from 0.960 to 0.967 g/cm³.

In embodiments of the disclosure, a high density polyethylene has a melt index, $I_2$ of from 0.01 to 100 g/10 min, or from 0.1 to 50 g/10 min, or from 0.1 to 10 g/10 min, or from 0.1 to 8 g/10 min, or from 0.5 to 10 g/10 min, or from 0.8 to 8 g/10 min, or from 0.5 to 8 g/10 min, or from 0.1 to 5 g/10 min, or from 0.5 to 5 g/10 min.

In embodiments of the disclosure, the high density polyethylene can be unimodal or multimodal.

In an embodiment of the disclosure, a high density polyethylene has a molecular weight distribution, Mw/Mn of from about 3.0 to about 20.0.

In embodiments of the disclosure, a high density polyethylene can be made using any of the well-known catalysts capable of generating high density polyethylene, such as chromium catalysts, Ziegler-Natta catalysts and so called "single site catalysts" such as but not limited to metallocene catalysts, constrained geometry catalysts, and phosphinimine catalysts.

In embodiments of the disclosure, the high density polyethylene can be made using a gas-phase, a solution-phase, or a slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof.

In an embodiment of the disclosure, the high density polyethylene is made in a solution phase polymerization process.

In an embodiment of the disclosure, the high density polyethylene is made with a single site catalyst formulation.

In an embodiment of the disclosure, the high density polyethylene is made with a single site catalyst formulation in a solution phase polymerization process.

In an embodiment of the disclosure, a high density polyethylene comprises from 0 to 1 weight percent of a nucleating agent or a mixture of nucleating agents.

In an embodiment of the disclosure, a high density polyethylene comprises from 100 to 3000 ppm (parts per million) of a nucleating agent or a mixture of nucleating agents.

In an embodiment of the disclosure, a high density polyethylene is a polyethylene homopolymer.

In an embodiment of the disclosure, a polyethylene homopolymer is a polyethylene homopolymer composition comprising a plurality of polyethylene homopolymer components.

In an embodiment of the disclosure, a high density polyethylene is a polyethylene homopolymer composition comprising at least a first ethylene homopolymer and at least a second ethylene homopolymer which is different from the first ethylene homopolymer.

In an embodiment of the disclosure, the first ethylene homopolymer has a melt index, $I_2$ which is lower than the melt index, $I_2$ of the second ethylene homopolymer.

In an embodiment of the disclosure, the first ethylene homopolymer has a melt index, $I_2$ which is at least 50 percent lower than the than melt index, $I_2$ of the second ethylene homopolymer.

In an embodiment of the disclosure, the first ethylene homopolymer has a melt index, $I_2$ which is at least 10 times lower than the melt index, $I_2$ of the second ethylene homopolymer.

In an embodiment of the disclosure, the first ethylene homopolymer has a weight average molecular weight, Mw that is higher than the weight average molecular weight, Mw of the second ethylene homopolymer.

As will be recognized by those skilled in the art, melt index, $I_2$, is in general inversely proportional to molecular weight. Thus, in an embodiment of the disclosure, the first ethylene homopolymer has a comparatively low melt index, $I_2$ (or, alternatively stated, a comparatively high molecular weight) in comparison to the second ethylene homopolymer.

In an embodiment of the disclosure, the first ethylene homopolymer has a density of from 0.950 to 0.975 g/cm³. In another embodiment of the disclosure, the first ethylene homopolymer has a density of from 0.955 to 0.970 g/cm³. In another embodiment of the disclosure, the first ethylene homopolymer has a density of from 0.955 to 0.965 g/cm³.

In an embodiment of the disclosure, the first ethylene homopolymer has a melt index, $I_2$ of less than about 1.0 grams/10 minutes (g/10 min).

In an embodiment of the disclosure, the first ethylene homopolymer has a melt index, $I_2$ of from about 0.01 to about 1.0 grams/10 minutes (g/10 min).

In an embodiment of the disclosure, the first ethylene homopolymer has a melt index, $I_2$ of from about 0.1 to about 2.0 grams/10 minutes (g/10 min).

In an embodiment of the disclosure, the first ethylene homopolymer has a melt index, $I_2$ of from about 0.8 to about 2.0 grams/10 minutes (g/10 min).

In an embodiment of the disclosure, the molecular weight distribution (Mw/Mn) of the first ethylene homopolymer is from about 1.7 to about 20.0. In further embodiments of the disclosure, the molecular weight distribution (Mw/Mn) of the first ethylene homopolymer is from about 2.0 to about 20.0, or from about 1.7 to about 4.0, or from about 2.0 to about 4.0.

In an embodiment of the disclosure, the first ethylene homopolymer may itself comprise one or more high density ethylene homopolymer subcomponents.

In an embodiment of the disclosure, the first ethylene homopolymer comprises from 95 to 5 weight percent (wt %) of the total weight of the first and second ethylene homopolymers. In an embodiment of the disclosure, the first ethylene homopolymer comprises from 95 to 20 weight percent (wt %) of the total weight of the first and second ethylene homopolymers. In an embodiment of the disclosure, the first ethylene homopolymer comprises from 95 to 30 weight percent (wt %) of the total weight of the first and second ethylene homopolymers. In an embodiment of the disclosure, the first ethylene homopolymer comprises from 95 to 40 weight percent (wt %) of the total weight of the first and second ethylene homopolymers. In an embodiment of the disclosure, the first ethylene homopolymer comprises from 90 to 30 weight percent (wt %) of the total weight of the first and second ethylene homopolymers. In an embodiment of the disclosure, the first ethylene homopolymer comprises from 85 to 30 weight percent (wt %) of the total weight of the first and second ethylene homopolymers. In an embodiment of the disclosure, the first ethylene homopolymer comprises from 80 to 30 weight percent (wt %) of the total weight of the first and second ethylene homopolymers. In an embodiment of the disclosure, the first ethylene homopolymer comprises from 75 to 30 weight percent (wt %) of the total weight of the first and second ethylene homopolymers.

In an embodiment of the disclosure, the first ethylene homopolymer comprises from 70 to 30 weight percent (wt %) of the total weight of the first and second ethylene homopolymers. In an embodiment of the disclosure, the first ethylene homopolymer comprises from 65 to 35 weight percent (wt %) of the total weight of the first and second ethylene homopolymers. In an embodiment of the disclosure, the first ethylene homopolymer comprises from 60 to 40 weight percent (wt %) of the total weight of the first and second ethylene homopolymers.

In an embodiment of the disclosure, the second ethylene homopolymer has a melt index, $I_2$ which is higher than the melt index, $I_2$ of the first ethylene homopolymer.

In an embodiment of the disclosure, the second ethylene homopolymer has a melt index, $I_2$ which is at least 50 percent greater than the melt index, $I_2$ of the first ethylene homopolymer.

In an embodiment of the disclosure the second ethylene homopolymer has a melt index, $I_2$ which is at least 10 times larger than the melt index, $I_2$ of the first ethylene homopolymer.

In an embodiment of the disclosure the second ethylene homopolymer has a melt index, $I_2$ which is at least 50 times larger than the melt index, $I_2$ of the first ethylene homopolymer.

In an embodiment of the disclosure, the second ethylene homopolymer has a weight average molecular weight, Mw that is lower than the weight average molecular weight, Mw of the first ethylene homopolymer.

As will be recognized by those skilled in the art, melt index, $I_2$, is in general inversely proportional to molecular weight. Thus, in an embodiment of the disclosure, the second ethylene homopolymer has a comparatively high melt index, $I_2$ (or, alternatively stated, a comparatively low molecular weight) in comparison to the first ethylene homopolymer.

In an embodiment of the disclosure, the second ethylene homopolymer has a density of from 0.950 to 0.975 g/cm³. In another embodiment of the disclosure, the second ethylene homopolymer has a density of from 0.955 to 0.970 g/cm³. In another embodiment of the disclosure, the second ethylene homopolymer has a density of from 0.955 to 0.965 g/cm³.

In an embodiment of the disclosure, the second ethylene homopolymer has a melt index, $I_2$ of greater than about 5.0 g/10 min. In further embodiments, the second ethylene homopolymer may have a melt index of from greater than about 5.0 to about 50 g/10 min, or from greater than 5.0 to about 40.0 g/10 min, or from greater than 5.0 to about 30 g/10 min, or from greater than 5.0 to about 20.0 g/10 min.

In an embodiment of the disclosure, the second ethylene homopolymer has a melt index, $I_2$ of from 15.0 to 30.0 g/10 min.

In an embodiment of the disclosure, the second ethylene homopolymer has a melt index, $I_2$ of greater than about 100 g/10 min, or greater than about 500 g/10 min, or greater than about 1000 g/10 min, or greater than about 5000 g/10 min.

In an embodiment of the disclosure, the molecular weight distribution (Mw/Mn) of the second ethylene homopolymer is from about 1.7 to about 20.0. In further embodiments of the disclosure, the molecular weight distribution (Mw/Mn) of the second ethylene homopolymer is from about 2.0 to about 20.0, or from about 1.7 to about 4.0, or from about 2.0 to about 4.0.

In an embodiment of the disclosure, the second ethylene homopolymer may itself comprise one or more high density ethylene homopolymer subcomponents.

In an embodiment of the disclosure, the second ethylene homopolymer comprises from 5 to 95 weight percent (wt %) of the total weight of the first and second ethylene homopolymers. In an embodiment of the disclosure, the second ethylene homopolymer comprises from 5 to 80 weight percent (wt %) of the total weight of the first and second ethylene homopolymers. In an embodiment of the disclosure, the second ethylene homopolymer comprises from 5 to 70 weight percent (wt %) of the total weight of the first and second ethylene homopolymers. In an embodiment of the disclosure, the second ethylene homopolymer comprises from 5 to 60 weight percent (wt %) of the total weight of the first and second ethylene homopolymers. In an embodiment of the disclosure, the second ethylene homopolymer comprises from 10 to 70 weight percent (wt %) of the total weight of the first and second ethylene homopolymers. In an embodiment of the disclosure, the second ethylene homopolymer comprises from 15 to 70 weight percent (wt %) of the total weight of the first and second ethylene homopolymers. In an embodiment of the disclosure, the second ethylene homopolymer comprises from 20 to 70 weight percent (wt %) of the total weight of the first and second ethylene homopolymers. In an embodiment of the disclosure, the second ethylene homopolymer comprises from 25 to 70 weight percent (wt %) of the total weight of the first and second ethylene homopolymers. In an embodiment of the disclosure, the first ethylene homopolymer comprises from 30 to 70 weight percent (wt %) of the total weight of the first and second ethylene homopolymers. In an embodiment of the disclosure, the second ethylene homopolymer comprises from 35 to 65 weight percent (wt %) of the total weight of the first and second ethylene homopolymers. In an embodiment of the disclosure, the second ethylene homopolymer comprises from 40 to 60 weight percent (wt %) of the total weight of the first and second ethylene homopolymers.

In an embodiment of the disclosure, the ratio of the melt index, $I_2$ of the second ethylene homopolymer to the melt index, $I_2$ of the first ethylene homopolymer, (i.e. the 12 of the second ethylene homopolymer divided by the $I_2$ of the first ethylene homopolymer) is at least 10 (i.e. the ratio is at least 10/1).

In an embodiment of the disclosure, the ratio of the melt index, $I_2$ of the second ethylene homopolymer to the melt index, $I_2$ of the first ethylene homopolymer, (i.e. the $I_2$ of the second ethylene homopolymer divided by the $I_2$ of the first ethylene homopolymer) is at least 50 (i.e. the ratio is at least 50/1).

In an embodiment of the disclosure, the polyethylene homopolymer composition has a bimodal profile in a gel permeation chromatograph.

In an embodiment of the disclosure, the polyethylene homopolymer composition has a multimodal profile in a gel permeation chromatograph.

In an embodiment of the disclosure, the polyethylene homopolymer composition comprises one or more than one nucleating agent.

In an embodiment of the disclosure, the polyethylene homopolymer composition comprises from 100 to 3000 ppm (parts per million) of a nucleating agent or a mixture of nucleating agents.

In an embodiment of the disclosure, the polyethylene homopolymer composition has a density of at least 0.950 grams per cubic centimeter, $g/cm^3$. In another embodiment of the disclosure, the polyethylene homopolymer composition has a density of a least 0.955 grams per cubic centimeter, $g/cm^3$.

In embodiments of the disclosure, the polyethylene homopolymer composition has a density of from 0.950 to 0.975 $g/cm^3$, or from 0.952 to 0.973 $g/cm^3$, or from 0.955 to 0.970 $g/cm^3$, or from 0.955 to 0.967 $g/cm^3$, or from 0.960 to 0.975 $g/cm^3$, or from 0.960 to 0.970 $g/cm^3$, or from 0.962 to 0.970 $g/cm^3$, or from 0.965 to 0.970 $g/cm^3$.

In an embodiment of the disclosure, the polyethylene homopolymer composition has a melt index, $I_2$ of from 0.5 to 10 g/10 min. In another embodiment of the disclosure, the polyethylene homopolymer composition has a melt index, $I_2$ of from 0.8 to 8 g/10 min. In another embodiment of the disclosure, the polyethylene homopolymer composition has a melt index, $I_2$ of from 0.8 to 5 g/10 min. In another embodiment of the disclosure, the polyethylene homopolymer composition has a melt index, $I_2$ of from 0.8 to 3 g/10 min.

In an embodiment of the disclosure, the polyethylene homopolymer composition has a molecular weight distribution (Mw/Mn) of from about 3.0 to about 20.0.

In embodiments of the present disclosure, the polyethylene homopolymer composition may be made by any blending process, non-limiting examples of which include: physical blending of particulate resins; co-feeding of different resins to a common extruder; melt mixing (in any conventional polymer mixing apparatus); solution blending; and in reactor blending in which a polymerization process employs two or more reactors configured in series or in parallel, or a combination thereof.

In an embodiment of the disclosure, the polyethylene homopolymer composition is prepared by a solution polymerization process using two reactors that operate under different polymerization conditions. This provides a uniform, in-situ blend of the first and second ethylene homopolymer components. An example of this process is described in published U.S. patent appl. Pub. No. 2006/0047078.

In an embodiment of the disclosure, the polyethylene homopolymer composition is prepared by melt blending a first and second ethylene homopolymer in an extruder.

In an embodiment of the disclosure, the polyethylene homopolymer composition is prepared by a solution polymerization process using two reactors that operate under different polymerization conditions. This provides a uniform, in situ blend of the first and second ethylene homopolymer components. Such a blend can, for example, be made according to U.S. patent appl. Pub. Nos. US2013/0225743, US2015/0203671, US2017/0002186, US20170130040, or US2008/018749.

In an embodiment of the disclosure, the high density polyethylene is prepared with a single site catalyst formulation.

In an embodiment of the disclosure, the catalyst components which make up the single site catalyst formulation are not particularly limited, i.e. a wide variety of catalyst components can be used. One non-limiting embodiment of a single site catalyst formulation comprises the following three or four components: (i) a bulky ligand-metal complex; (ii) an alumoxane co-catalyst; (iii) an ionic activator; and optionally (iv) a hindered phenol.

Non-limiting examples of component (i) are represented by formula (I):

$$(L^4)_n M(PI)_b (Q)_n \tag{I}$$

wherein $(L^4)$ represents a bulky ligand; M represents a metal atom; PI represents a phosphinimine ligand; Q represents a leaving group; a is 0 or 1; b is 1 or 2; (a+b)=2; n is 1 or 2; and the sum of (a+b+n) equals the valance of the metal M.

In an embodiment of the disclosure, $L^A$ is selected from the group consisting of unsubstituted cyclopentadienyl, substituted cyclopentadienyl, unsubstituted indenyl, substituted indenyl, unsubstituted fluorenyl and substituted fluorenyl.

In an embodiment of the disclosure, M is a metal selected from the group consisting of titanium, hafnium and zirconium In further non-limiting embodiments of the disclosure, the bulky ligand $L^A$ in formula (I) includes unsubstituted or substituted cyclopentadienyl ligands or cyclopentadienyl-type ligands, heteroatom substituted and/or heteroatom containing cyclopentadienyl-type ligands. In additional non-limiting embodiments, the bulky ligand $L^A$ in formula (I) includes cyclopentaphenanthreneyl ligands, unsubstituted or substituted indenyl ligands, benzindenyl ligands, unsubstituted or substituted fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrazolyl ligands, carbazolyl ligands, borabenzene ligands and the like, including hydrogenated versions thereof, for example tetrahydroindenyl ligands. In other embodiments, $L^A$ may be any other ligand structure capable of $\eta$-bonding to the metal M, such embodiments include both $\eta^3$-bonding and $\eta^5$-bonding to the metal M. In other embodiments, $L^A$ may comprise one or more heteroatoms, for example, nitrogen, silicon, boron, germanium, sulfur and phosphorous, in combination with carbon atoms to form an open, acyclic, or a fused ring, or ring system, for example, a heterocyclopentadienyl ancillary ligand. Other non-limiting embodiments for $L^A$ include bulky amides, phosphides, alkoxides, aryloxides, imides, carbolides, borollides, porphyrins, phthalocyanines, corrins and other polyazomacrocycles.

Non-limiting examples of metal M in formula (I) include Group 4 metals, titanium, zirconium and hafnium.

In an embodiment of the disclosure, the metal M is titanium, Ti.

The phosphinimine ligand, PI, is defined by formula (II):

$$(R^P)_3P{=}N{-} \qquad (II)$$

wherein the $R^P$ groups are independently selected from: a hydrogen atom; a halogen atom; $C_{1-20}$ hydrocarbyl radicals which are unsubstituted or substituted with one or more halogen atom(s); a $C_{1-8}$ alkoxy radical; a $C_{6-10}$ aryl radical; a $C_{6-10}$ aryloxy radical; an amido radical; a silyl radical of formula $-Si(R^s)_3$, wherein the $R^s$ groups are independently selected from, a hydrogen atom, a $C_{1-8}$ alkyl or alkoxy radical, a $C_{6-10}$ aryl radical, a $C_{6-10}$ aryloxy radical, or a germanyl radical of formula $-Ge(R^G)_3$, wherein the $R^G$ groups are defined as $R^s$ is defined in this paragraph.

The leaving group Q is any ligand that can be abstracted from formula (I) forming a catalyst species capable of polymerizing one or more olefin(s). An equivalent term for Q is an "activatable ligand", i.e. equivalent to the term "leaving group". In some embodiments, Q is a monoanionic labile ligand having a sigma bond to M. Depending on the oxidation state of the metal, the value for n is 1 or 2 such that formula (I) represents a neutral bulky ligand-metal complex. Non-limiting examples of Q ligands include a hydrogen atom, halogens, $C_{1-20}$ hydrocarbyl radicals, $C_{1-20}$ alkoxy radicals, $C_{5-10}$ aryl oxide radicals; these radicals may be linear, branched or cyclic or further substituted by halogen atoms, $C_{1-10}$ alkyl radicals, $C_{1-10}$ alkoxy radicals, $C_{6-10}$ aryl or aryloxy radicals. Further non-limiting examples of Q ligands include weak bases such as amines, phosphines, ethers, carboxylates, dienes, hydrocarbyl radicals having from 1 to 20 carbon atoms. Two Q ligands may also be joined to one another and form for example, a substituted or unsubstituted diene ligand (e.g. 1,3-butadiene); or a delocalized heteroatom containing group such as an acetate or acetamidinate group.

In an embodiment of the disclosure, Q is independently selected from the group consisting of a hydrogen atom, a halogen atom, a $C_{1-10}$ hydrocarbyl radical, a $C_{1-10}$ alkoxy radical and a $C_{5-10}$ aryl oxide radical; wherein each of said hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals In an embodiment of the disclosure, each Q is independently selected from the group consisting of a halide atom, a $C_{1-4}$ alkyl radical and a benzyl radical. In another embodiment of the disclosure activatable ligands Q are monoanionic such as a halide (e.g. chloride) or a hydrocarbyl (e.g. methyl, benzyl).

The second single site catalyst component, component (ii), is an alumoxane co-catalyst that activates component (i) to a cationic complex. An equivalent term for "alumoxane" is "aluminoxane"; although the exact structure of this cocatalyst is uncertain, subject matter experts generally agree that it is an oligomeric species that contain repeating units of the general formula (III):

$$(R)_2AlO{-}(Al(R){-}O)_n{-}Al(R)_2 \qquad (III)$$

where the R groups may be the same or different linear, branched or cyclic hydrocarbyl radicals containing 1 to 20 carbon atoms and n is from 0 to about 50. A non-limiting example of an alumoxane is methyl aluminoxane (or MAO) wherein each R group in formula (III) is a methyl radical.

The third catalyst component (iii) of the single site catalyst formulation is an ionic activator. In general, ionic activators are comprised of a cation and a bulky anion; wherein the latter is substantially non-coordinating. Non-limiting examples of ionic activators are boron ionic activators that are four coordinate with four ligands bonded to the boron atom. Non-limiting examples of boron ionic activators include the following formulas (IV) and (V) shown below:

$$[R^5]{+}[B(R^7)_4]^- \qquad (IV)$$

where B represents a boron atom, $R^5$ is an aromatic hydrocarbyl (e.g. triphenyl methyl cation) and each $R^7$ is independently selected from phenyl radicals which are unsubstituted or substituted with from 3 to 5 substituents selected from fluorine atoms, $C_{1-4}$ alkyl or alkoxy radicals which are unsubstituted or substituted by fluorine atoms; and a silyl radical of formula $-Si(R^9)_3$, where each $R^9$ is independently selected from hydrogen atoms and $C_{1-4}$ alkyl radicals, and; compounds of formula (V);

$$[(R^8)_tZH]^+[B(R^7)_4]^- \qquad (V)$$

where B is a boron atom, H is a hydrogen atom, Z is a nitrogen or phosphorus atom, t is 2 or 3 and $R^8$ is selected from $C_{1-8}$ alkyl radicals, phenyl radicals which are unsubstituted or substituted by up to three $C_{1-4}$ alkyl radicals, or one $R^8$ taken together with the nitrogen atom may form an anilinium radical and $R^7$ is as defined above in formula (IV).

In both formula (IV) and (V), a non-limiting example of $R^7$ is a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators include: triethylammonium tetra(phenyl) boron, tripropylammonium tetra(phenyl)boron, tri(n-butyl) ammonium tetra(phenyl)boron, trimethylammonium tetra (p-tolyl)boron, trimethylammonium tetra(o-tolyl)boron, tributylammonium tetra(pentafluorophenyl)boron, tripropy-lammonium tetra(o,p-dimethylphenyl)boron, tributylammo-nium tetra(m,m-dimethylphenyl)boron, tributylammonium tetra(p-trifluoromethylphenyl)boron, tributylammonium tet-ra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethyl-anilinium tetra(phenyl)n-butylboron, N,N-2,4,6-pentameth-ylanilinium tetra(phenyl)boron, di-(isopropyl)ammonium tetra(pentafluorophenyl)boron, dicyclohexylammonium tet-ra(phenyl)boron, triphenylphosphonium tetra(phenyl)boron, tri(methylphenyl)phosphonium tetra(phenyl)boron, tri(dim-ethylphenyl)phosphonium tetra(phenyl)boron, tropillium tetrakispentafluorophenyl borate, triphenylmethylium tet-rakispentafluorophenyl borate, benzene(diazonium)tetrak-ispentafluorophenyl borate, tropillium tetrakis(2,3,5,6-tet-rafluorophenyl)borate, triphenylmethylium tetrakis(2,3,5,6-tetrafluorophenyl)borate, benzene(diazonium)tetrakis(3,4,5-trifluorophenyl)borate, tropillium tetrakis(3,4,5-trifluorophenyl)borate, benzene(diazonium)tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium)tetrakis(1,2,2-trifluoroethenyl)borate, tropillium tetrakis(2,3,4,5-tetrafluorophenyl)borate, triphenylmethylium tetrakis(2,3,4, 5-tetrafluorophenyl)borate, and benzene(diazonium)tetrakis (2,3,4,5 tetrafluorophenyl)borate. Readily available commercial ionic activators include N,N-dimethylanilinium tetrakispentafluorophenyl borate, and triphenylmethylium tetrakispentafluorophenyl borate.

The optional fourth catalyst component of the single site catalyst formulation is a hindered phenol, component (iv). Non-limiting example of hindered phenols include butylated phenolic antioxidants, butylated hydroxytoluene, 2,4-di-ter-tiarybutyl-6-ethyl phenol, 4,4'-methylenebis (2,6-di-tertiary-butylphenol), 1,3,5-trimethyl-2,4,6-tris (3,5-di-tert-butyl-4-hydroxybenzyl)benzene and octadecyl-3-(3',5'-di-tert-butyl-4'-hydroxyphenyl) propionate.

To produce an active single site catalyst formulation in an embodiment of the disclosure the quantity and mole ratios of the three or four components, (i) through (iv) are optimized as described in U.S. Pat. No. 9,512,282.

In an embodiment of the disclosure, the high density polyethylene comprises a nucleating agent or a mixture of nucleating agents.

The term "nucleating agent", as used herein, is meant to convey its conventional meaning to those skilled in the art of preparing nucleated polyolefin compositions, namely an additive that changes the crystallization behavior of a poly-mer as the polymer melt is cooled.

A review of nucleating agents is provided in U.S. Pat. Nos. 5,981,636, 6,465,551 and 6,599,971.

Nucleating agents which are commercially available and which may be added to the high density polyethylene are dibenzylidene sorbital esters (such as the products sold under the trademark MILLAD® 3988 by Milliken Chemical and IRGACLEAR® by Ciba Specialty Chemicals). Further examples of nucleating agents which may be added to the high density polyethylene include the cyclic organic struc-tures disclosed in U.S. Pat. No. 5,981,636 (and salts thereof, such as disodium bicyclo[2.2.1]heptene dicarboxylate); the saturated versions of the structures disclosed in U.S. Pat. No. 5,981,636 (as disclosed in U.S. Pat. No. 6,465,551; Zhao et al., to Milliken); the salts of certain cyclic dicarboxylic acids having a hexahydrophthalic acid structure (or "HHPA" structure) as disclosed in U.S. Pat. No. 6,599,971 (Dotson et al., to Milliken); and phosphate esters, such as those dis-closed in U.S. Pat. No. 5,342,868 and those sold under the trade names NA-11 and NA-21 by Asahi Denka Kogyo, cyclic dicarboxylates and the salts thereof, such as the divalent metal or metalloid salts, (particularly, calcium salts) of the HHPA structures disclosed in U.S. Pat. No. 6,599,971. For clarity, the HHPA structure generally comprises a ring structure with six carbon atoms in the ring and two carbox-ylic acid groups which are substituents on adjacent atoms of the ring structure. The other four carbon atoms in the ring may be substituted, as disclosed in U.S. Pat. No. 6,599,971. An example is 1,2-cyclohexanedicarboxylicacid, calcium salt (CAS registry number 491589-22-1). Still further examples of nucleating agents which may be added to the high density polyethylene include those disclosed in WO2015042561, WO2015042563, WO2015042562 and WO2011050042.

In an embodiment of the disclosure, the high density polyethylene comprises a nucleating agent or the mixture of nucleating agents which comprises a salt of a dicarboxylic acid compound.

Many of the above described nucleating agents may be difficult to mix with the high density polyethylene that is being nucleated and it is known to use dispersion aids, such as for example, zinc stearate, to mitigate this problem.

In an embodiment of the disclosure, the nucleating agents are well dispersed in the high density polyethylene.

In embodiments of the disclosure, the amount of nucle-ating agent used can be from 100 to 10,000 parts by million per weight (based on the weight of the high density poly-ethylene), or from 100 to 5,000 ppm, or from 100 to 3,000 ppm.

It will be appreciated by those skilled in the art that some care must be taken to ensure that the nucleating agent is well dispersed. In an embodiment of the disclosure, the nucleat-ing agent is added in finely divided form (less than 50 microns, especially less than 10 microns) to the high density polyethylene to facilitate mixing. This type of "physical blend" (i.e. a mixture of the nucleating agent and the resin in solid form) is generally preferable to the use of a "masterbatch" of the nucleator (where the term "master-batch" refers to the practice of first melt mixing the addi-tive—the nucleator, in this case—with a small amount of high density polyethylene—then melt mixing the "master-batch" with the remaining bulk of the high density polyeth-ylene).

In an embodiment of the disclosure, an additive such as nucleating agent may be added to the high density polyeth-ylene by way of a "masterbatch", where the term "master-batch" refers to the practice of first melt mixing the additive (e.g. a nucleator) with a small amount of the high density polyethylene, followed by melt mixing the "masterbatch" with the remaining bulk of the high density polyethylene.

In embodiments of the disclosure, the high density poly-ethylene may also contain other conventional additives, non-limiting examples of which include: (1) primary anti-oxidants (such as for example hindered phenols, including vitamin E); (2) secondary antioxidants (such as for example phosphites and phosphonites); and (3) process aids (such as for example fluoroelastomer and/or polyethylene glycol bound process aid).

Still other non-limiting examples of additives that may be added to the high density polyethylene in embodiments of the disclosure include nitrones, antacids, UV absorbers, metal deactivators, pigments, dyes, fillers and reinforcing agents, nano-scale organic or inorganic materials, antistatic agents, lubricating agents such as calcium stearates, and slip additives such as erucimide and behenamide.

Film Structure

In an embodiment of the present disclosure, a film structure comprises alternating and adjacent layers of two different polyethylene polymers: (A) a linear low density polyethylene and (B) a high density polyethylene. Accordingly, in an embodiment the film structure of the present disclosure will be an all polyethylene film structure and it will be a multilayer film structure.

In an embodiment, the difference in density between the linear low density polyethylene (A) and the high density polyethylene (B) is at least 0.015 g/cm$^3$.

In an embodiment, the difference in density between the linear low density polyethylene (A) and the high density polyethylene (B) is at least 0.030 g/cm$^3$.

In an embodiment of the disclosure an all polyethylene multilayer film structure has at least one skin layer comprising (A) a linear low density polyethylene.

In an embodiment of the disclosure an all polyethylene multilayer film structure has at least three alternating and adjacent film layers of two different polyethylene polymers: (A) a linear low density polyethylene and (B) a high density polyethylene.

In an embodiment of the disclosure an all polyethylene multilayer film structure has at least five alternating and adjacent film layers of two different polyethylene polymers: (A) a linear low density polyethylene and (B) a high density polyethylene.

In an embodiment of the disclosure an all polyethylene multilayer film structure has at least seven alternating and adjacent film layers of two different polyethylene polymers: (A) a linear low density polyethylene and (B) a high density polyethylene.

In an embodiment of the disclosure an all polyethylene multilayer film structure has at least nine alternating and adjacent film layers of two different polyethylene polymers: (A) a linear low density polyethylene and (B) a high density polyethylene.

In an embodiment of the disclosure an all polyethylene multilayer film structure has three alternating and adjacent film layers of two different polyethylene polymers: (A) a linear low density polyethylene and (B) a high density polyethylene.

In an embodiment of the disclosure an all polyethylene multilayer film structure has five alternating and adjacent film layers of two different polyethylene polymers: (A) a linear low density polyethylene and (B) a high density polyethylene.

In an embodiment of the disclosure an all polyethylene multilayer film structure has seven alternating and adjacent film layers of two different polyethylene polymers: (A) a linear low density polyethylene and (B) a high density polyethylene.

In an embodiment of the disclosure an all polyethylene multilayer film structure has nine alternating and adjacent film layers of two different polyethylene polymers: (A) a linear low density polyethylene and (B) a high density polyethylene.

In an embodiment of the disclosure an all polyethylene multilayer film structure has eleven alternating and adjacent film layers of two different polyethylene polymers: (A) a linear low density polyethylene and (B) a high density polyethylene.

In an embodiment of the disclosure an all polyethylene multilayer film structure has three alternating and adjacent film layers of two different polyethylene polymers: (A) a linear low density polyethylene and (B) a high density polyethylene, further provided that the film layers are arranged in the following structure: A/B/A.

In an embodiment of the disclosure an all polyethylene multilayer film structure has three alternating and adjacent film layers of two different polyethylene polymers: (A) a linear low density polyethylene and (B) a high density polyethylene, further provided that the film layers are arranged in the following structure: B/A/B.

In an embodiment of the disclosure an all polyethylene multilayer film structure has five alternating and adjacent film layers of two different polyethylene polymers: (A) a linear low density polyethylene and (B) a high density polyethylene, further provided that the film layers are arranged in the following structure: A/B/A/B/A.

In an embodiment of the disclosure an all polyethylene multilayer film structure has five alternating and adjacent film layers of two different polyethylene polymers: (A) a linear low density polyethylene and (B) a high density polyethylene, further provided that the film layers are arranged in the following structure: B/A/B/A/B.

In an embodiment of the disclosure an all polyethylene multilayer film structure has seven alternating and adjacent film layers of two different polyethylene polymers: (A) a linear low density polyethylene and (B) a high density polyethylene, further provided that the film layers are arranged in the following structure: A/B/A/B/A/B/A.

In an embodiment of the disclosure an all polyethylene multilayer film structure has seven alternating and adjacent film layers of two different polyethylene polymers: (A) a linear low density polyethylene and (B) a high density polyethylene, further provided that the film layers are arranged in the following structure: B/A/B/A/B/A/B.

In an embodiment of the disclosure an all polyethylene multilayer film structure has nine alternating and adjacent film layers of two different polyethylene polymers: (A) a linear low density polyethylene and (B) a high density polyethylene, further provided that the film layers are arranged in the following structure: A/B/A/B/A/B/A/B/A.

In an embodiment of the disclosure an all polyethylene multilayer film structure has nine alternating and adjacent film layers of two different polyethylene polymers: (A) a linear low density polyethylene and (B) a high density polyethylene, further provided that the film layers are arranged in the following structure: B/A/B/A/B/A/B/A/B.

In an embodiment of the disclosure an all polyethylene multilayer film structure has eleven alternating and adjacent film layers of two different polyethylene polymers: (A) a linear low density polyethylene and (B) a high density polyethylene, further provided that the film layers are arranged in the following structure: A/B/A/B/A/B/A/B/A/B/A.

In an embodiment of the disclosure an all polyethylene multilayer film structure has eleven alternating and adjacent film layers of two different polyethylene polymers: (A) a linear low density polyethylene and (B) a high density polyethylene, further provided that the film layers are arranged in the following structure: B/A/B/A/B/A/B/A/B/A/B.

Non-limiting examples of processes to prepare film structures include blown film and cast film processes.

In the blown film extrusion process an extruder heats, melts, mixes and conveys a thermoplastic, or a thermoplastic blend. Once molten, the thermoplastic is forced through an annular die to produce a thermoplastic tube. In the case of co-extrusion, multiple extruders are employed to produce a multilayer thermoplastic tube. The temperature of the extrusion process is primarily determined by the thermoplastic or thermoplastic blend being processed, for example the melting temperature or glass transition temperature of the thermoplastic and the desired viscosity of the melt. In the case of polyolefins, typical extrusion temperatures are from 330° F. to 550° F. (166° C. to 288° C.). Upon exit from the annular die, the thermoplastic tube is inflated with air, cooled, solidified and pulled through a pair of nip rollers. Due to air inflation, the tube increases in diameter forming a bubble of desired size. Due to the pulling action of the nip rollers the bubble is stretched in the machine direction. Thus, the bubble is stretched in two directions: the transverse direction (TD) where the inflating air increases the diameter of the bubble; and the machine direction (MD) where the nip rollers stretch the bubble. As a result, the physical properties of blown films are typically anisotropic, i.e. the physical properties differ in the MD and TD directions; for example, film tear strength and tensile properties typically differ in the MD and TD. In some prior art documents, the terms "cross direction" or "CD" is used; these terms are equivalent to the terms "transverse direction" or "TD" used in this disclosure. In the blown film process, air is also blown on the external bubble circumference to cool the thermoplastic as it exits the annular die. The final width of the film is determined by controlling the inflating air or the internal bubble pressure; in other words, increasing or decreasing bubble diameter. Film thickness is controlled primarily by increasing or decreasing the speed of the nip rollers to control the drawdown rate. After exiting the nip rollers, the bubble or tube is collapsed and may be slit in the machine direction thus creating sheeting. Each sheet may be wound into a roll of film. Each roll may be further slit to create film of the desired width. Each roll of film is further processed into a variety of consumer products as described below.

The cast film process is similar in that a single or multiple extruder(s) may be used; however, the various thermoplastic materials are metered into a flat die and extruded into a monolayer or multilayer sheet, rather than a tube. In the cast film process the extruded sheet is solidified on a chill roll.

In the cast film process, films are extruded from a flat die onto a chilled roll or a nipped roll, optionally, with a vacuum box and/or air-knife. The cast films may be monolayer or coextruded multi-layer films obtained by various extrusion through a single or multiple dies. The resultant films may be the used as-is or may be laminated to other films or substrates, for example by thermal, adhesive lamination or direct extrusion onto a substrate. The resultant films and laminates may be subjected to other forming operations such as embossing, stretching, thermoforming. Surface treatments such as corona may be applied and the films may be printed.

In the cast film extrusion process, a thin film is extruded through a slit onto a chilled, highly polished turning roll, where it is quenched from one side. The speed of the roller controls the draw ratio and final film thickness. The film is then sent to a second roller for cooling on the other side. Finally, it passes through a system of rollers and is wound onto a roll.

Depending on the end-use application, the film structure may span a wide range of thicknesses. Non-limiting examples include, food packaging films where thicknesses may range from about 0.5 mil (13 μm) to about 4 mil (102 μm), and heavy duty sack films where thickness may range from about 2 mil (51 μm) to about 10 mil (254 μm).

In embodiments of the disclosure, the thickness of a specific layer within a multilayer film structure may be from about 1% (i.e. the lower limit), or from about 3%, or from about 5%, or from about 10%, or from about 15%, or from about 20%, or from about 25%, or from about 30% of the total multilayer film thickness. In other embodiments, the thickness of a specific layer within a multilayer film may be up to about 95% (i.e. the upper limit) in other cases about 80% and in still other cases about 65% of the total multilayer film thickness.

The film structure can be used in a wide range of manufactured articles. Non-limiting examples of such manufactured articles include: food packaging films (fresh and frozen foods, liquids and granular foods), stand-up pouches, retortable packaging and bag-in-box packaging; barrier films (oxygen, moisture, aroma, oil, etc.) and modified atmosphere packaging; light and heavy duty shrink films and wraps, collation shrink film, pallet shrink film, shrink bags, shrink bundling and shrink shrouds; light and heavy duty stretch films, hand stretch wrap, machine stretch wrap and stretch hood films; high clarity films; heavy-duty sacks; household wrap, overwrap films and sandwich bags; industrial and institutional films, trash bags, can liners, magazine overwrap, newspaper bags, mail bags, sacks and envelopes, bubble wrap, carpet film, furniture bags, garment bags, coin bags, auto panel films; medical applications such as gowns, draping and surgical garb; construction films and sheeting, asphalt films, insulation bags, masking film, landscaping film and bags; geomembrane liners for municipal waste disposal and mining applications; batch inclusion bags; agricultural films, mulch film and green house films; in-store packaging, self-service bags, boutique bags, grocery bags, carry-out sacks and t-shirt bags; oriented films, machine direction and biaxially oriented films and functional film layers in oriented polypropylene (OPP) films, e.g. sealant and/or toughness layers. Additional manufactured articles include laminates and/or multilayer films; laminations with paper; aluminum foil laminates or laminates containing vacuum deposited aluminum; polyamide laminates; polyester laminates; extrusion coated laminates, and; hot-melt adhesive formulations.

Cast films structures of the present disclosure may be used in a variety of end-uses, such as for example, for food packaging (dry foods, fresh foods, frozen foods, liquids, processed foods, powders, granules), for packaging of detergents, toothpaste, towels, for labels and release liners. The cast film structures may also be used in unitization and industrial packaging, notably in stretch films. The cast film structures may also be suitable in hygiene and medical applications, for example in breathable and non-breathable films used in diapers, adult incontinence products, feminine hygiene products, ostomy bags.

Desired film structure physical properties typically depend on the application of interest. Non-limiting examples of desirable film structure properties include: optical properties (gloss and haze), dart impact, Elmendorf tear, modulus (1% and 2% secant modulus), puncture-propagation tear resistance, tensile properties (yield strength, break strength, elongation at break, toughness, etc.) and curling properties.

In embodiments of the disclosure, a multilayer film may consist of a 3-layer, a 5-layer, a 7-layer, a 9-layer or 11-layer structure of different polymers made in a co-extrusion process.

In an embodiment of the disclosure, each film structure layer may be chosen to provide a specific functionality or property. Without wishing to be bound by theory, a multilayer polyethylene film structure may be designed to achieve targeted performance requirements for many end-use applications in a cost-effective, value-added and recyclable manner. Some possible desirable properties of a film structure may include barrier, mechanical, sealing, and optical properties, each of which may be heavily influenced by the nature of the polymer layers in the film structure. The versatility of a multilayer film structure makes it a uniquely tunable polymeric material for food packaging, lamination, thermoforming, lidding films, collation shrink films, oriented films, agricultural films, medical and health films or industrial liners applications.

The films used in the film structure may optionally include, depending on its intended use, additives and adjuvants. Non-limiting examples of additives and adjuvants include, anti-blocking agents, antioxidants, heat stabilizers, slip agents, processing aids, anti-static additives, colorants, dyes, filler materials, light stabilizers, light absorbers, lubricants, pigments, plasticizers, nucleating agents and combinations thereof.

In an embodiment a film structure is prepared on a multilayer blown film line.

In an embodiment a film structure is prepared on a multilayer cast film line.

An embodiment of the disclosure is a multilayer film structure having a thickness of from 0.5 to 10 mil.

In embodiments of the disclosure, a 1.5 mil multilayer blown film structure will have a dart impact strength of ≥85 g/mil, or ≥90 g/mil, or ≥95 g/mil, or ≥100 g/mil.

In embodiments of the disclosure, a 1.5 mil multilayer blown film structure will have a dart impact strength of ≥85 g/mil, or ≥90 g/mil, or ≥95 g/mil, or ≥100 g/mil, provided that the film structure has nine alternating and adjacent film layers of two different polyethylene polymers: (A) a linear low density polyethylene and (B) a high density polyethylene, arranged in the following structure: A/B/A/B/A/B/A/B/A.

In another embodiment of the disclosure, a 1.5 mil multilayer blown film structure will have a dart impact strength of from 85 to 120 g/mil. In a further embodiment of the disclosure, a 1.5 mil multilayer blown film structure will have dart impact strength of from 90 g/mil to 110 g/mil.

In embodiments of the disclosure, a 1.5 mil multilayer blown film structure will have a dart impact strength of from 85 to 120 g/mil, or from 90 to 110 g/mil, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 2 mil multilayer blown film structure will have a dart impact strength of ≥85 g/mil, or ≥90 g/mil, or ≥95 g/mil, or ≥100 g/mil.

In embodiments of the disclosure, a 2 mil multilayer blown film structure will have a dart impact strength of ≥85 g/mil, or ≥90 g/mil, or ≥95 g/mil, or ≥100 g/mil, provided that the film structure has nine alternating and adjacent film layers of two different polyethylene polymers: (A) a linear low density polyethylene and (B) a high density polyethylene, arranged in the following structure: A/B/A/B/A/B/A/B/A.

In another embodiment of the disclosure, a 2 mil multilayer blown film structure will have a dart impact strength of from 85 to 120 g/mil. In a further embodiment of the disclosure, a 2 mil multilayer blown film structure will have dart impact strength of from 90 g/mil to 110 g/mil.

In embodiments of the disclosure, a 2 mil multilayer blown film structure will have a dart impact strength of from 85 to 120 g/mil, or from 90 g/mil to 110 g/mil, provided that the film structure has nine alternating and adjacent film layers of two different polyethylene polymers: (A) a linear low density polyethylene and (B) a high density polyethylene, arranged in the following structure: A/B/A/B/A/B/A/B/A.

In an embodiment of the disclosure, the dart impact strength of an all polyethylene multilayer film structure is increased by arranging adjacent film layers of two different polyethylene polymers: (A) a linear low density polyethylene and (B) a high density polyethylene into strictly alternating layers (i.e. film structures of the type: A/B/A . . . , such as A/B/A, A/B/A/B/A, A/B/A/B/A/B/A, A/B/A/B/A/B/A/B/A, etc.; or film structures of the type B/A/B . . . , such as B/A/B, B/A/B/A/B, B/A/B/A/B/A/B, B/A/B/A/B/A/B/A/B, etc.).

In embodiments of the disclosure, a 1.5 mil multilayer blown film structure will have a haze value of ≤25%, or ≤20%, or ≤18%, or ≤15%. In embodiments of the disclosure, a 1.5 mil multilayer blown film structure will have a haze value of from 8 to 25%, or from 8 to 20%, or from 10 to 20%, or from 8 to 18%, or from 10 to 18%, or from 8 to 15%, or from 10 to 15%.

In embodiments of the disclosure, a 1.5 mil multilayer blown film structure will have a haze value of ≤25%, or ≤20%, or ≤18%, or ≤15%, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 1.5 mil multilayer blown film structure will have a haze value of from 8 to 25%, or from 8 to 20%, or from 10 to 20%, or from 8 to 18%, or from 10 to 18%, or from 8 to 15%, or from 10 to 15%, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 2 mil multilayer blown film structure will have a haze value of ≤25%, or ≤20%, or ≤18%, or ≤15%. In embodiments of the disclosure, a 2 mil multilayer blown film structure will have a haze value of from 8 to 25%, or from 8 to 20%, or from 10 to 20%, or from 8 to 18%, or from 10 to 18%.

In embodiments of the disclosure, a 2 mil multilayer blown film structure will have a haze value of ≤25%, or ≤20%, or ≤18%, or ≤15%, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 1.5 mil multilayer blown film structure will have a haze value of from 8 to 25%, or from 8 to 20%, or from 10 to 20%, or from 8 to 18%, or from 10 to 18%, provided that the film structure has nine alternating and adjacent film layers of two different polyethylene polymers: (A) a linear low density polyethylene and (B) a high density polyethylene, arranged in the following structure: A/B/A/B/A/B/A/B/A.

In an embodiment of the disclosure, the haze value of an all polyethylene multilayer film structure is decreased by arranging adjacent film layers of two different polyethylene polymers: (A) a linear low density polyethylene and (B) a high density polyethylene into strictly alternating layers (i.e. film structures of the type: A/B/A . . . , such as A/B/A, A/B/A/B/A, A/B/A/B/A/B/A, A/B/A/B/A/B/A/B/A, etc.; or film structures of the type B/AB . . . , such as B/A/B, B/A/B/A/B, B/A/B/A/B/A/B, B/A/B/A/B/A/B/A/B, etc.).

In embodiments of the disclosure, a 1.5 mil multilayer blown film structure will have a gloss (at 45 degrees) of at least 45, or at least 50 or at least 55.

In embodiments of the disclosure, a 1.5 mil multilayer blown film structure will have a gloss (at 45 degrees) of at least 45, or at least 50 or at least 55, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 2 mil multilayer blown film structure will have a gloss (at 45 degrees) of at least 45, or at least 50 or at least 55.

In embodiments of the disclosure, a 2 mil multilayer blown film structure will have a gloss (at 45 degrees) of at least 45, or at least 50 or at least 55, provided that the film structure has nine alternating and adjacent film layers of two different polyethylene polymers: (A) a linear low density polyethylene and (B) a high density polyethylene, arranged in the following structure: A/B/A/B/A/B/A/B/A.

In an embodiment of the disclosure, the gloss (at 45 degrees) of an all polyethylene multilayer film structure is increased by arranging adjacent film layers of two different polyethylene polymers: (A) a linear low density polyethylene and (B) a high density polyethylene into strictly alternating layers (i.e. film structures of the type: AB/A . . . , such as A/B/A, A/B/A/B/A, A/B/A/B/A/B/A, A/B/A/B/A/B/A/B/A, etc.; or film structures of the type B/AB . . . , such as B/AB, B/AB/AB, B/AB/AB/AB, B/A/B/AB/AB/AB, etc.).

In embodiments of the disclosure, a 1.5 mil multilayer blown film structure will have a puncture energy of ≥50 J/mm, or ≥55 J/mm, or ≥60 J/mm.

In embodiments of the disclosure, a 1.5 mil multilayer blown film structure will have a puncture energy of ≥50 J/mm, or ≥55 J/mm, or ≥60 J/mm, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 1.5 mil multilayer blown film structure will have a puncture energy of from 50 to 90 J/mm, or from 50 to 80 J/mm, or from 50 to 75 J/mm, or from 55 to 75 J/mm.

In embodiments of the disclosure, a 1.5 mil multilayer blown film structure will have a puncture energy of from 50 to 90 J/mm, or from 50 to 80 J/mm, or from 50 to 75 J/mm, or from 55 to 75 J/mm, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 2 mil multilayer blown film structure will have a puncture energy of ≥50 J/mm, or ≥55 J/mm, or ≥60 J/mm, or ≥65 J/mm, or 70 J/mm.

In embodiments of the disclosure, a 2 mil multilayer blown film structure will have a puncture energy of ≥50 J/mm, or ≥55 J/mm, or ≥60 J/mm, or ≥65 J/mm, or ≥70 J/mm, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 2 mil multilayer blown film structure will have a puncture energy of from 50 to 90 J/mm, or from 60 to 90 J/mm, or from 60 to 85 J/mm.

In embodiments of the disclosure, a 2 mil multilayer blown film structure will have a puncture energy of from 50 to 90 J/mm, or from 60 to 90 J/mm, or from 60 to 85 J/mm, provided that the film structure has nine alternating and adjacent film layers of two different polyethylene polymers: (A) a linear low density polyethylene and (B) a high density polyethylene, arranged in the following structure: A/B/A/B/A/B/A/B/A.

In an embodiment of the disclosure, the puncture energy of an all polyethylene multilayer film structure is increased by arranging adjacent film layers of two different polyethylene polymers: (A) a linear low density polyethylene and (B) a high density polyethylene into strictly alternating layers (i.e. film structures of the type: A/B/A . . . , such as A/B/A, A/B/A/B/A, A/B/A/B/A/B/A, A/B/A/B/A/B/A/B/A, etc.; or film structures of the type B/A/B . . . , such as B/A/B, B/A/B/A/B, B/A/B/A/B/A/B, B/A/B/A/B/A/B/A/B, etc.).

In embodiments of the disclosure, a 1.5 mil multilayer blown film structure will have a Dynatup maximum load of ≥5.0 lb, or ≥5.5 lb.

In embodiments of the disclosure, a 1.5 mil multilayer blown film structure will have a Dynatup maximum load of from 4.5 to 9.0 lb, or from 5.0 to 8.5 lb, or from 5.0 to 8.0 lb, or from 5.0 to 7.0 lb.

In embodiments of the disclosure, a 1.5 mil multilayer blown film structure will have a Dynatup maximum load of ≥5.0 lb, or ≥5.5 lb, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 1.5 mil multilayer blown film structure will have a Dynatup maximum load of from 4.5 to 9.0 lb, or from 5.0 to 8.5 lb, or from 5.0 to 8.0 lb, or from 5.0 to 7.0 lb, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 2 mil multilayer blown film structure will have a Dynatup maximum load of ≥5.5 lb, or ≥6.0 lb, or ≥6.5 lb or ≥7.0 lb.

In embodiments of the disclosure, a 2 mil multilayer blown film structure will have a Dynatup maximum load of from 5.5 to 10.0 lb, or from 6.0 to 9.5 lb, or from 6.5 to 9.0 lb.

In embodiments of the disclosure, a 2 mil multilayer blown film structure will have a Dynatup maximum load of ≥5.5 lb, or ≥6.0 lb, or ≥6.5 lb or ≥7.0 lb, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 2 mil multilayer blown film structure will have a Dynatup maximum load of from 5.5 to 10.0 lb, or from 6.0 to 9.5 lb, or from 6.5 to 9.0 lb, provided that the film structure has nine alternating and adjacent film layers of two different polyethylene polymers: (A) a linear low density polyethylene and (B) a high density polyethylene, arranged in the following structure: A/B/A/B/A/B/A.

In an embodiment of the disclosure, the Dynatup maximum load of an all polyethylene multilayer film structure is increased by arranging adjacent film layers of two different polyethylene polymers: (A) a linear low density polyethylene and (B) a high density polyethylene into strictly alternating layers (i.e. film structures of the type: A/B/A . . . , such as AB/A, A/B/A/B/A, A/B/AB/AB/A, A/B/AB/A/B/AB/A, etc.; or film structures of the type B/AB . . . , such as B/AB, B/A/B/A/B, B/A/B/A/B/A/B, B/A/B/A/B/A/B/A/B, etc.).

In embodiments of the disclosure, a 1.5 mil multilayer blown film structure will have a machine direction (MD) 1% secant modulus of ≥400 MPa, or ≥450 MPa, or ≥500 MPa.

In embodiments of the disclosure, a 1.5 mil multilayer blown film structure will have a machine direction (MD) 1% secant modulus of from 400 MPa to 700 MPa, or from 450 to 650 MPa, or from 500 to 650 MPa.

In embodiments of the disclosure, a 1.5 mil multilayer blown film structure will have a machine direction (MD) 1% secant modulus of ≥400 MPa, or ≥450 MPa, or ≥500 MPa, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 1.5 mil multilayer blown film structure will have a machine direction (MD) 1% secant modulus of from 400 MPa to 700 MPa, or from 450 to 650 MPa, or from 500 to 650 MPa, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 2 mil multilayer blown film structure will have a machine direction (MD) 1% secant modulus of ≥400 MPa, or ≥450 MPa, or ≥500 MPa.

In embodiments of the disclosure, a 2 mil multilayer blown film structure will have a machine direction (MD) 1% secant modulus of from 400 MPa to 700 MPa, or from 450 to 650 MPa, or from 500 to 650 MPa.

In embodiments of the disclosure, a 2 mil multilayer blown film structure will have a machine direction (MD) 1% secant modulus of ≥400 MPa, or ≥450 MPa, or ≥500 MPa, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 2 mil multilayer blown film structure will have a machine direction (MD) 1% secant modulus of from 400 MPa to 700 MPa, or from 450 to 650 MPa, or from 500 to 650 MPa, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 1.5 mil multilayer blown film structure will have a transverse direction (TD) 1% secant modulus of ≥500 MPa, or ≥550 MPa, or ≥600 MPa, or ≥650 MPa, or ≥700 MPa.

In embodiments of the disclosure, a 1.5 mil multilayer blown film structure will have a transverse direction (TD) 1% secant modulus of from 500 MPa to 900 MPa, or from 550 to 900 MPa, or from 550 to 850 MPa, or from 600 to 850 MPa, or from 600 to 800 MPa.

In embodiments of the disclosure, a 1.5 mil multilayer blown film structure will have a transverse direction (TD) 1% secant modulus of ≥500 MPa, or ≥550 MPa, or ≥600

MPa, or ≥650 MPa, or ≥700 MPa, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 1.5 mil multilayer blown film structure will have a transverse direction (TD) 1% secant modulus of from 500 MPa to 900 MPa, or from 550 to 900 MPa, or from 550 to 850 MPa, or from 600 to 850 MPa, or from 600 to 800 MPa, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 2 mil multilayer blown film structure will have a transverse direction (TD) 1% secant modulus of ≥500 MPa, or ≥550 MPa, or ≥600 MPa, or ≥650 MPa, or ≥700 MPa.

In embodiments of the disclosure, a 2 mil multilayer blown film structure will have a transverse direction (TD) 1% secant modulus of from 500 MPa to 900 MPa, or from 550 to 900 MPa, or from 550 to 850 MPa, or from 600 to 850 MPa, or from 600 to 800 MPa.

In embodiments of the disclosure, a 2 mil multilayer blown film structure will have a transverse direction (TD) 1% secant modulus of ≥500 MPa, or ≥550 MPa, or ≥600 MPa, or ≥650 MPa, or ≥700 MPa, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 2 mil multilayer blown film structure will have a transverse direction (TD) 1% secant modulus of from 500 MPa to 900 MPa, or from 550 to 900 MPa, or from 550 to 850 MPa, or from 600 to 850 MPa, or from 600 to 800 MPa, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 1.5 mil multilayer blown film structure will have an oxygen transmission rate (OTR) of ≤100 cm³ per 100 inches² per 24 hours, or ≤80 cm³ per 100 inches² per 24 hours, or ≤75 cm³ per 100 inches² per 24 hours, or ≤70 cm³ per 100 inches² per 24 hours.

In embodiments of the disclosure, a 1.5 mil multilayer blown film structure will have an oxygen transmission rate (OTR) of from 35 to 100 cm³ per 100 inches² per 24 hours, or from 40 to 80 cm³ per 100 inches² per 24 hours, or from 50 to 75 cm³ per 100 inches² per 24 hours.

In embodiments of the disclosure, a 1.5 mil multilayer blown film structure will have an oxygen transmission rate (OTR) of ≤100 cm³ per 100 inches² per 24 hours, or ≤80 cm³ per 100 inches² per 24 hours, or ≤75 cm³ per 100 inches² per 24 hours, or ≤70 cm³ per 100 inches² per 24 hours, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 1.5 mil multilayer blown film structure will have an oxygen transmission rate (OTR) of from 35 to 100 cm³ per 100 inches² per 24 hours, or from 40 to 80 cm³ per 100 inches² per 24 hours, or from 50 to 75 cm³ per 100 inches² per 24 hours, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 2 mil multilayer blown film structure will have an oxygen transmission rate (OTR) of $\leq 100$ cm$^3$ per 100 inches$^2$ per 24 hours, or $\leq 75$ cm$^3$ per 100 inches$^2$ per 24 hours, or $\leq 60$ cm$^3$ per 100 inches$^2$ per 24 hours, or $\leq 50$ cm$^3$ per 100 inches$^2$ per 24 hours.

In embodiments of the disclosure, a 2 mil multilayer blown film structure will have an oxygen transmission rate (OTR) of from 25 to 100 cm$^3$ per 100 inches$^2$ per 24 hours, or from 25 to 75 cm$^3$ per 100 inches$^2$ per 24 hours, or from 25 to 60 cm$^3$ per 100 inches$^2$ per 24 hours, or from 30 to 75 cm$^3$ per 100 inches$^2$ per 24 hours, or from 30 to 60 cm$^3$ per 100 inches$^2$ per 24 hours, or from 25 to 50 cm$^3$ per 100 inches$^2$ per 24 hours.

In embodiments of the disclosure, a 2 mil multilayer blown film structure will have an oxygen transmission rate (OTR) of $\leq 100$ cm$^3$ per 100 inches$^2$ per 24 hours, or $\leq 75$ cm$^3$ per 100 inches$^2$ per 24 hours, or $\leq 60$ cm$^3$ per 100 inches$^2$ per 24 hours, or $\leq 50$ cm$^3$ per 100 inches$^2$ per 24 hours, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 2 mil multilayer blown film structure will have an oxygen transmission rate (OTR) of from 25 to 100 cm$^3$ per 100 inches$^2$ per 24 hours, or from 25 to 75 cm$^3$ per 100 inches$^2$ per 24 hours, or from 25 to 60 cm$^3$ per 100 inches$^2$ per 24 hours, or from 30 to 75 cm$^3$ per 100 inches$^2$ per 24 hours, or from 30 to 60 cm$^3$ per 100 inches$^2$ per 24 hours, or from 25 to 50 cm$^3$ per 100 inches$^2$ per 24 hours, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 1.5 multilayer mil blown film structure will have a water vapor transmission rate (WVTR) of $\leq 0.2400$ grams per 100 inches$^2$ per 24 hours, or $\leq 0.2200$ grams per 100 inches$^2$ per 24 hours, or $\leq 0.2000$ grams per 100 inches$^2$ per 24 hours, or $\leq 0.1800$ grams per 100 inches$^2$ per 24 hours.

In embodiments of the disclosure, a 1.5 multilayer mil blown film structure will have a water vapor transmission rate (WVTR) of from 0.1000 to 0.2400 grams per 100 inches$^2$ per 24 hours, or from 0.1000 to 0.2000 grams per 100 inches$^2$ per 24 hours, or from 0.1200 to 0.1800 grams per 100 inches$^2$ per 24 hours, or from 0.1400 to 0.2000 grams per 100 inches$^2$ per 24 hours, or from 0.1400 to 0.1800 grams per 100 inches$^2$ per 24 hours.

In embodiments of the disclosure, a 1.5 multilayer mil blown film structure will have a water vapor transmission rate (WVTR) of $\leq 0.2400$ grams per 100 inches$^2$ per 24 hours, or $\leq 0.2200$ grams per 100 inches$^2$ per 24 hours, or $\leq 0.2000$ grams per 100 inches$^2$ per 24 hours, or $\leq 0.1800$ grams per 100 inches$^2$ per 24 hours, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 1.5 multilayer mil blown film structure will have a water vapor transmission rate (WVTR) of from 0.1000 to 0.2400 grams per 100 inches$^2$ per 24 hours, or from 0.1000 to 0.2000 grams per 100 inches$^2$ per 24 hours, or from 0.1200 to 0.1800 grams per 100 inches$^2$ per 24 hours, or from 0.1400 to 0.2000 grams per 100 inches$^2$ per 24 hrs, or from 0.1400 to 0.1800 grams per 100 inches$^2$ per 24 hours, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 2 mil multilayer blown film structure will have a water vapor transmission rate (WVTR) of $\leq 0.2000$ grams per 100 inches$^2$ per 24 hours, or $\leq 0.1800$ grams per 100 inches$^2$ per 24 hours, or $\leq 0.1600$ grams per 100 inches$^2$ per 24 hours, or $\leq 0.1400$ grams per 100 inches$^2$ per 24 hours, or $\leq 0.1200$ grams per 100 inches$^2$ per 24 hours.

In embodiments of the disclosure, a 2 mil multilayer blown film structure will have a water vapor transmission rate (WVTR) of from 0.0400 to 0.2000 grams per 100 inches$^2$ per 24 hours, or from 0.0600 to 0.1800 grams per 100 inches$^2$ per 24 hours, or from 0.0600 to 0.1400 grams per 100 inches$^2$ per 24 hours, or from 0.0800 to 0.1400 grams per 100 inches$^2$ per 24 hours.

In embodiments of the disclosure, a 2 mil multilayer blown film structure will have a water vapor transmission rate (WVTR) of $\leq 0.2000$ grams per 100 inches$^2$ per 24 hours, or $\leq 0.1800$ grams per 100 inches$^2$ per 24 hours, or $\leq 0.1600$ grams per 100 inches$^2$ per 24 hours, or $\leq 0.1400$ grams per 100 inches$^2$ per 24 hours, or $\leq 0.1200$ grams per 100 inches$^2$ per 24 hours, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 2 mil multilayer blown film structure will have a water vapor transmission rate (WVTR) of from 0.0400 to 0.2000 grams per 100 inches$^2$ per 24 hours, or from 0.0600 to 0.1800 grams per 100 inches$^2$ per 24 hours, or from 0.0600 to 0.1400 grams per 100 inches$^2$ per 24 hours, or from 0.0800 to 0.1400 grams per 100 inches$^2$ per 24 hours, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 1.5 mil multilayer blown film structure will have a machine direction (MD) curvature radius of greater than 5 mm, or greater than 10 mm, or greater than 15 mm, or greater than 25 mm, or there will be approximately no curl in the machine direction.

In embodiments of the disclosure, a 1.5 mil multilayer blown film structure will have a transverse direction (TD) curvature radius of greater than 5 mm, or greater than 10 mm, or greater than 15 mm, or greater than 25 mm, or there will be approximately no curl in the transverse direction.

In embodiments of the disclosure, a 1.5 mil multilayer blown film structure will have a machine direction (MD) curvature radius of greater than 5 mm, or greater than 10 mm, or greater than 15 mm, or greater than 25 mm, or there will be approximately no curl in the machine direction, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 1.5 mil multilayer blown film structure will have a transverse direction (TD) curvature radius of greater than 5 mm, or greater than 10 mm, or greater than 15 mm, or greater than 25 mm, or there will be approximately no curl in the transverse direction, provided that the film structure has nine alternating and adjacent film layers of two different polyethylene polymers: (A) a linear low density polyethylene and (B) a high density polyethylene, arranged in the following structure: A/B/A/B/A/B/AB/A.

In embodiments of the disclosure, a 2 mil multilayer blown film structure will have a machine direction (MD) curvature radius of greater than 5 mm, or greater than 10 mm, or greater than 15 mm, or greater than 25 mm, or there will be approximately no curl in the machine direction.

In embodiments of the disclosure, a 2 mil multilayer blown film structure swill have a transverse direction (TD) curvature radius of greater than 5 mm, or greater than 10 mm, or greater than 15 mm, or greater than 25 mm, or there will be approximately no curl in the transverse direction.

In embodiments of the disclosure, a 2 mil multilayer blown film structure will have a machine direction (MD) curvature radius of greater than 5 mm, or greater than 10 mm, or greater than 15 mm, or greater than 25 mm, or there will be approximately no curl in the machine direction, provided that the film structure has nine alternating and adjacent film layers of two different polyethylene polymers: (A) a linear low density polyethylene and (B) a high density polyethylene, arranged in the following structure: A/B/A/B/A/B/A/B/A.

In embodiments of the disclosure, a 2 mil multilayer blown film structure swill have a transverse direction (TD) curvature radius of greater than 5 mm, or greater than 10 mm, or greater than 15 mm, or greater than 25 mm, or there will be approximately no curl in the transverse direction, provided that the film structure has nine alternating and adjacent film layers of two different polyethylene polymers: (A) a linear low density polyethylene and (B) a high density polyethylene, arranged in the following structure: A/B/A/B/A/B/A/B/A.

In an embodiment of the disclosure, the curl properties of an all polyethylene multilayer film structure are improved (i.e. one or more of the MD and TD curvature radii are increased or approximately no curl occurs in one or more of the MD and TD directions) by arranging adjacent film layers of two different polyethylene polymers: (A) a linear low density polyethylene and (B) a high density polyethylene into strictly alternating layers (i.e. film structures of the type: A/B/A . . . , such as A/B/A, A/B/A/B/A, A/B/A/B/A/B/A, A/B/A/B/A/B/A/B/A/B/A, etc.; or film structures of the type B/A/B . . . , such as B/A/B, B/A/B/A/B, B/A/B/A/B/A/B, B/A/B/AB/A/B/A/B, etc.).

The following examples are presented for the purpose of illustrating selected embodiments of this disclosure; it being understood, that the examples presented do not limit the claims presented.

Examples

General Testing Procedures

Prior to testing, each polymer specimen was conditioned for at least 24 hours at 23±2° C. and 50±10% relative humidity and subsequent testing was conducted at 23±2° C. and 50±10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials.

Density

Polymer densities were determined using ASTM D792-13 (Nov. 1, 2013).

Melt Index

Polymer melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively.

Conventional Size Exclusion Chromatography (SEC)

Polymer sample solutions (1 to 3 mg/mL) were prepared by heating the polymer in 1,2,4-trichlorobenzene (TCB) and rotating on a wheel for 4 hours at 150° C. in an oven. An antioxidant (2,6-di-tert-butyl-4-methylphenol (BHT)) was added to the mixture in order to stabilize the polymer against oxidative degradation. The BHT concentration was 250 ppm. Polymer solutions were chromatographed at 140° C. on a PL 220 high-temperature chromatography unit equipped with four SHODEX™ columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect GPC columns from oxidative degradation. The sample injection volume was 200 μL. The GPC columns were calibrated with narrow distribution polystyrene standards. The polystyrene molecular weights were converted to poly-ethylene molecular weights using the Mark-Houwink equa-tion, as described in the ASTM standard test method D6474-12 (December 2012). The GPC raw data were processed with the CIRRUS® GPC software, to produce molar mass averages ($M_n$, $M_w$, $M_z$) and molar mass distribution (e.g. Polydispersity, $M_w/M_n$). In the polyethylene art, a com-monly used term that is equivalent to SEC is GPC, i.e. Gel Permeation Chromatography.

Dart Impact

Film dart impact strength was determined using ASTM D1709-09 Method A (May 1, 2009). In this disclosure the dart impact test employed a 1.5 inch (38 mm) diameter hemispherical headed dart.

Puncture

Film "puncture", the energy (J/mm) required to break the film was determined using ASTM D5748-95 (originally adopted in 1995, reapproved in 2012).

Tensile Properties

The following film tensile properties were determined using ASTM D882-12 (Aug. 1, 2012): tensile break strength (MPa), elongation at break (%), tensile yield strength (MPa), tensile elongation at yield (%) and film toughness or total energy to break (ft·lb/in³). Tensile properties were measured in the both the machine direction (MD) and the transverse direction (TD) of the blown films.

Film Modulus

The secant modulus is a measure of film stiffness. The secant modulus is the slope of a line drawn between two points on the stress-strain curve, i.e. the secant line. The first point on the stress-strain curve is the origin, i.e. the point that corresponds to the origin (the point of zero percent strain and zero stress), and; the second point on the stress-strain curve is the point that corresponds to a strain of 1%; given these two points the 1% secant modulus is calculated and is expressed in terms of force per unit area (MPa). The 2% secant modulus is calculated similarly. This method is used to calculated film modulus because the stress-strain relation-ship of polyethylene does not follow Hook's law; i.e. the stress-strain behavior of polyethylene is non-linear due to its viscoelastic nature. Secant moduli were measured using a conventional Instron tensile tester equipped with a 200 lbf load cell. Strips of monolayer film samples were cut for testing with following dimensions: 14 inch long, 1 inch wide and 1 mil thick; ensuring that there were no nicks or cuts on the edges of the samples. Film samples were cut in both the machine direction (MD) and the transverse direction (TD) and tested. ASTM conditions were used to condition the samples. The thickness of each film was accurately measured with a hand-held micrometer and entered along with the sample name into the Instron software. Samples were loaded in the Instron with a grip separation of 10 inch and pulled at a rate of 1 inch/min generating the strain-strain curve. The 1% and 2% secant modulus were calculated using the Instron software.

Flexural Properties

The flexural properties, i.e. flexural secant and tangent modulus and flexural strength were determined using ASTM D790-10 (published in April 2010).

Optical Properties

Film optical properties were measured as follows: Haze, ASTM D1003-13 (Nov. 15, 2013), and; Gloss ASTM D2457-13 (Apr. 1, 2013).

Dynatup Impact

Instrumented impact testing was carried out on a machine called a DYNATUP© Impact Tester purchased from Illinois Test Works Inc., Santa Barbara, Calif., USA; those skilled in the art frequently call this test the Dynatup impact test. Testing was completed according to the following procedure. Test samples are prepared by cutting about 5 inch (12.7 cm) wide and about 6 inch (15.2 cm) long strips from a roll of blown film; film was about 1 mil thick. Prior to testing, the thickness of each sample was accurately measured with a handheld micrometer and recorded. ASTM conditions were employed. Test samples were mounted in the 9250 DYNATUP Impact drop tower/test machine using the pneumatic clamp. DYNATUP tup #1, 0.5 inch (1.3 cm) diameter, was attached to the crosshead using the Allen bolt supplied. Prior to testing, the crosshead is raised to a height such that the film impact velocity is 10.9±0.1 ft/s. A weight was added to the crosshead such that: 1) the crosshead slowdown, or tup slowdown, was no more than 20% from the beginning of the test to the point of peak load; and 2) the tup must penetrate through the specimen. If the tup does not penetrate through the film, additional weight is added to the crosshead to increase the striking velocity. During each test the DYNATUP Impulse Data Acquisition System Software collected the experimental data (load (lb) versus time). At least 5 film samples are tested and the software reports the following average values: "Dynatup Maximum (Max) Load (lb)", the highest load measured during the impact test; "Dynatup Total Energy (ft·lb)", the area under the load curve from the start of the test to the end of the test (puncture of the sample), and; "Dynatup Total Energy at Max Load (ft·lb)", the area under the load curve from the start of the test to the maximum load point.

Water Vapor Transmission Rate

Water Vapor Transmission Rate ("WVTR", expressed as grams of water vapor transmitted per 100 square inches of film per day at a specified film thickness (mils), or g/100 in²/day) was measured in accordance with ASTM F1249-90 with a MOCON® permatron developed by Modern Controls Inc. at conditions of 100° F. (37.8° C.) and 100% relative humidity. A control (comparative) experiment was conducted using a single low melt index HDPE resin having a melt index, $I_2$ of about 0.95 grams/10 minutes, a density of 0.9575 g/cm³ and a molecular weight distribution, $M_w/M_n$, of 3.51 (an ethylene homopolymer designated SCLAIR® 19C, available from NOVA Chemicals Corporation, Calgary, Alberta, Canada). The WVTR test was run in duplicate and the average WVTR was reported.

Oxygen Transmission Rate (OTR)

Oxygen transmission rate (OTR), expressed as cm³ of oxygen transmitted per 100 square inches of film per day at a specified film thickness (mils), or cm³/100 in²/day) was measured on film samples (4 inch×4 inch) at 0% relative humidity and 23° C. using MOCON® OX-TRAN® System Model 2/21T. The OTR test was run in duplicate and the average rate of oxygen permeation was determined at an equilibrium state.

Film Curl

Film curling is characterized substantially as was reported in U.S. Pat. No. 8,709,611 by cutting a 2 inch×2 inch "X" into each film structure, where the two cuts of the X are perpendicular. Each cut is oriented with a 45 degree angle to both the machine and transverse directions. The two cuts produce four triangles, which are then free to curl. The X is oriented so that two of the triangles curl only in the machine direction of the film, and two of the triangles curled only in the transverse direction. The films are mounted onto a rigid substrate and allowed to curl for 20 hours. After 20 hours, the direction of curl (either towards or away from the inner or outer side of the film) is noted, and the radii of curvature of the curl in both the machine and transverse directions are measured. A larger radius of curvature in this measurement indicates less curl. When films curl by an amount that is more than 90 degrees, the radius of curvature is measured directly. When films curl less than 90 degrees, it is difficult to measure the radius directly. In these cases, the radius of curvature is determined by measuring the distance, l, from the base of the triangle to its free point and the distance, w, from the base of the triangle to the projection of the free point into the plane of the film. With these two dimensions, the radius of curvature, r, is calculated numerically using the equation:

$$w/r = \sin(l/r)$$

Differential Scanning Calorimetry (DSC)

Primary melting peak (° C.), melting peak temperatures (° C.), heat of fusion (J/g) and crystallinity (%) was determined using differential scanning calorimetry (DSC) as follows: the instrument was first calibrated with indium; after the calibration, a polymer specimen is equilibrated at 0° C. and then the temperature was increased to 200° C. at a heating rate of 10° C./min; the melt was then kept isothermally at 200° C. for five minutes; the melt was then cooled to 0° C. at a cooling rate of 10° C./min and kept at 0° C. for five minutes; the specimen was then heated to 200° C. at a heating rate of 10° C./min. The DSC™, heat of fusion and crystallinity are reported from the $2^{nd}$ heating cycle.

Modulated Differential Scanning Calorimetry (Modulated DSC)

Thermal characterization of the multilayer films was conducted using Modulated DSC (MDSC) experiments on a TA instruments Q-2000. Modulated DSC uses two simultaneous heating rates—a linear heating rate that provides information similar to the standard DSC, and a sinusoidal or modulated heating rate that permits the simultaneous measurement of the sample's heat capacity. Therefore, it improves resolution and sensitivity to detect weak transitions. The heating/cooling/heating protocol was used with heating ramp of 1.25° C./min and cooling ramp of 10° C./min. Modulation was set at ±0.20° C. every 60 seconds.

CRYSTAF/TREF (CTEF)

The commoner distribution, of a polymer was measured using a CRYSTAF/TREF 200+ unit equipped with an IR detector, hereinafter the CTREF. The acronym "TREF" refers to Temperature Rising Elution Fractionation. The CTREF was supplied by PolymerChar S.A. (Valencia Technology Park, Gustave Eiffel, 8, Paterna, E-46980 Valencia, Spain). The CTREF was operated in the TREF mode, which generates the chemical composition of the polymer sample as a function of elution temperature, the Co/Ho ratio (Co-polymer/Homopolymer ratio) and the CDBI (the Composition Distribution Breadth Index), i.e. $CDBI_{50}$ and $CDBI_{25}$. A polymer sample (80 to 100 mg) was placed into the reactor vessel of the CTREF. The reactor vessel was filled with 35 mL of 1,2,4-trichlorobenzene (TCB) and the polymer was dissolved by heating the solution to 150° C. for 2 hours. An aliquot (1.5 mL) of the solution was then loaded into the CTREF column which was packed with stainless steel beads. The column, loaded with sample, was allowed to stabilize at 110° C. for 45 minutes. The polymer was then crystallized from solution, within the column, by dropping the temperature to 30° C. at a cooling rate of 0.09° C./minute. The column was then equilibrated for 30 minutes at 30° C. The crystallized polymer was then eluted from the column with TCB flowing through the column at 0.75 mL/minute, while the column was slowly heated from 30° C. to 120° C. at a heating rate of 0.25° C./minute. The raw CTREF data were processed using Polymer Char software, an Excel spreadsheet and CTREF software developed in-house. $CDBI_{50}$ was defined as the percent of polymer whose composition is within 50% of the median comonomer composition; CDB150 was calculated from the composition distribution cure and the normalized cumulative integral of the composition distribution curve, as described in U.S. Pat. No. 5,376,439. Those skilled in the art will understand that a calibration curve is required to convert a CTREF elution temperature to comonomer content, i.e. the amount of comonomer in the ethylene/α-olefin polymer fraction that elutes at a specific temperature. The generation of such calibration curves are described in the prior art, e.g. Wild, et al., J. Polym. Sci., Part B, Polym. Phys., Vol. 20 (3), pages 441-455: hereby fully incorporated by reference. $CDBI_{25}$ as calculated in a similar manner; $CDBI_{25}$ is defined as the percent of polymer whose composition is with 25% of the median comonomer composition. At the end of each sample run, the CTREF column was cleaned for 30 minutes; specifically, with the CTREF column temperature at 160° C., TCB flowed (0.5 mL/minute) through the column for 30 minutes.

All Polyethylene Blown Film Structure (Multilayer)

Multilayer blown films were produced on a 9-layer blown film line commercially available from Brampton Engineering (Brampton ON, Canada). The structure of two inventive 9-layer film structures, each one having an alternating structure sequence of A/B/A/B/A/B/A/B/A, and either a 1.5 mil overall thickness (Inventive Example 1) or a 2.0 mil overall thickness (Inventive Example 2), are shown in Table 1. Also shown in Table 1, are the structures of four comparative 9-layer film structures: two of which have an entirely block like structure sequence of B/B/B/B/A/A/A/A/A with either a 1.5 mil overall thickness (Comparative Example 1), or a 2.0 mil overall thickness (Comparative Example 2); and two of which have a somewhat random structure sequence having both alternating and block like portions, B/B/A/B/B/A/B/B/A (Comparative Example 3), and B/A/A/B/A/A/B/A/A (Comparative Example 4), each having a 1.5 mil overall thickness.

The properties of the nine layer blown films (having either a thickness of 1.5 mil or 2 mil) made as described above are provided in Table 2.

The A layers were made of a linear low density polyethylene: SCLAIR® FP120-C, an ethylene/1-octene copolymer available from NOVA Chemicals Corporation having a density of about 0.920 $g/cm^3$ and a melt index, $I_2$ of about 1 g/10 min. The B layers were made of a high density polyethylene: SURPASS® HPs167-AB, a high density ethylene homopolymer available from NOVA Chemicals Corporation having a density of about 0.967 $g/cm^3$ and a melt index, $I_2$ of about 1.20 g/10 min. Each of the Inventive and Comparative multilayer film structures were designed to contain about 50 weight percent of the SCLAIR® FP120-C material and about 50 weight percent of the SURPASS® HPs167-AB material.

The multilayer die technology consisted of a pancake die, FLEX-STACK Co-extrusion die (SCD), with flow paths machined onto both sides of a plate, the die tooling diameter was 6.3-inches, in this disclosure a die gap of 85-mil was used consistently, film was produced at a Blow-Up-Ratio (BUR) of 2.5 and the output rate of the line was held constant at 250 lb/hr. The specifications of the nine extruders was as follows: screws 1.5-in diameter, 30/1 length to diameter ratio, 7-polyethylene screws with single flights and Maddox mixers, 2-Nylon screws, extruders were air cooled, equipped with 20-H.P. motors and all extruders were equipped with gravimetric blenders. The nip and collapsing frame included a Decatex horizontal oscillating haul-off and pearl cooling slats just below the nips. The line was equipped with a turret winder and oscillating slitter knives. All die temperatures were maintained at a constant 480° F. (i.e. the layer sections, mandrel bottom, mandrel, inner lip and outer lip).

TABLE 1

| | Multilayer Blown Film Structure | | | | | | | |
|---|---|---|---|---|---|---|---|---|
| | Example No. | | | | | | | |
| | Inventive 1 | | Comparative 1 | | Comparative 3 | | Comparative 4 | |
| | Film Structure Width | | | | | | | |
| | 1.5 mil | | 1.5 mil | | 1.5 mil | | 1.5 mil | |
| | Film Structure | | | | | | | |
| | A/B/A/B/A/B/A/B/A | | B/B/B/B/A/A/A/A/A | | B/B/A/B/B/A/B/B/A | | B/A/A/B/A/A/B/A/A | |
| | Material | wt. % of the 9-layer structure | Material | wt. % of the 9-layer structure | Material | wt. % of the 9-layer structure | Material | wt. % of the 9-layer structure |
| Layer 1 (inside of bubble) | FP120-C | 10 | HPs167-AB | 12.5 | HPs167-AB | 8.33 | HPs167-AB | 16.7 |

TABLE 1-continued

Multilayer Blown Film Structure

| | Material | wt.% | Material | wt.% | Material | wt.% | Material | wt.% |
|---|---|---|---|---|---|---|---|---|
| Layer 2 | HPs167-AB | 12.5 | HPs167-AB | 12.5 | HPs167-AB | 8.33 | FP120-C | 8.33 |
| Layer 3 | FP120-C | 10 | HPs167-AB | 12.5 | FP120-C | 16.7 | FP120-C | 8.33 |
| Layer 4 | HPs167-AB | 12.5 | HPs167-AB | 12.5 | HPs167-AB | 8.34 | HPs167-AB | 16.6 |
| Layer 5 | FP120-C | 10 | FP120-C | 10 | HPsl67-AB | 8.34 | FP120-C | 8.34 |
| Layer 6 | HPsl67-AB | 12.5 | FP120-C | 10 | FP120-C | 16.6 | FP120-C | 8.34 |
| Layer 7 | FP120-C | 10 | FP120-C | 10 | HPs167-AB | 8.33 | HPs167-AB | 16.7 |
| Layer 8 | HPs167-AB | 12.5 | FP120-C | 10 | HPs167-AB | 8.33 | FP120-C | 8.33 |
| Layer 9 (outside of bubble; the skin layer) | FP120-C | 10 | FP120-C | 10 | FP120-C | 16.7 | FP120-C | 8.33 |

| | Example No. | | | |
|---|---|---|---|---|
| | Inventive 2 | | Comparative 2 | |
| | Film Structure Width | | | |
| | 2.0 mil | | 2.0 mil | |
| | Film Structure | | | |
| | A/B/A/B/A/B/A/B/A | | B/B/B/B/A/A/A/A/A | |
| | Material | wt. % of the 9-layer structure | Material | wt. % of the 9-layer structure |
| Layer 1 (inside of bubble) | FP120-C | 10 | HPs167-AB | 12.5 |
| Layer 2 | HPs167-AB | 12.5 | HPs167-AB | 12.5 |
| Layer 3 | FP120-C | 10 | HPs167-AB | 12.5 |
| Layer 4 | HPs167-AB | 12.5 | HPs167-AB | 12.5 |
| Layer 5 | FP120-C | 10 | FP120-C | 10 |
| Layer 6 | HPs167-AB | 12.5 | FP120-C | 10 |
| Layer 7 | FP120-C | 10 | FP120-C | 10 |
| Layer 8 | HPs167-AB | 12.5 | FP120-C | 10 |
| Layer 9 (outside of bubble) | FP120-C | 10 | FP120-C | 10 |

TABLE 2

Multilayer Blown Film Structure

| Example No. | Inventive 1 | Comparative 1 | Comparative 3 | Comparative 4 | Inventive 2 | Comparative 2 |
|---|---|---|---|---|---|---|
| Film Structure Width | 1.5 mil | 1.5 mil | 1.5 mil | 1.5 mil | 2.0 mil | 2.0 mil |
| Film Structure | A/B/A/B/A/ B/A/B/A | B/B/B/B/A/ A/A/A/A | B/B/A/B/B/ A/B/B/A | B/A/A/B/A/ A/B/A/A | A/B/A/B/A/ B/A/B/A | B/B/B/B/A/ A/A/A/A |
| Haze (%) | 14.38 | 29.4 | 29.4 | 30.07 | 17.61 | 27.6 |
| Gloss at 45° | 58 | 48 | 47 | 47 | 50 | 47 |
| Puncture Energy (J/mm) | 64 | 48 | 52 | 59 | 73 | 64 |
| Dart Impact (g/mil) | 105 | 82 | 90 | 97 | 106 | 79 |
| Dynatup Maximum Loading (lb) | 5.98 | 4.81 | 5.59 | 5.66 | 7.52 | 6.64 |
| 1% Sec Modulus - MD (Mpa) | 562 | 561 | 550 | 541 | 533 | 533 |
| 1% Sec Modulus - TD (Mpa) | 747 | 757 | 714 | 742 | 720 | 771 |
| WVTR (g/100 in$^2$/day) | 0.1646 | 0.1625 | 0.1654 | 0.1728 | 0.1144 | 0.1022 |
| OTR (cm$^3$/100 inch$^2$/day) | 66.68 | 61.17 | 63.01 | 65.28 | 42.72 | 39.55 |
| MD Curvature Radius (mm) | No curl | 2 | — | — | No curl (0) | 2 |
| TD Curvature Radius (mm) | No curl | 4 | — | — | No curl (0) | 5 |

The optical properties (both haze and gloss) of the 9-layer blown films are presented in Table 2. From the data, it is clear that film structures of either a 1.5 mil or a 2 mil thickness and which have an alternating arrangement of layers comprising polymers (A) and (B) rather than a block arrangement of layers comprising polymers (A) and (B) have significantly better optical properties. Inventive Example 1 has a haze which is 54% lower than Comparative Example 1, while Inventive Example 2 has a haze which is 36% lower than Comparative Example 2. Inventive Example 1 has a gloss value which is 20% higher than Comparative Example 1, while Inventive Example 2 has a gloss value which 6% higher than Comparative Example 2. Similar improvements in haze and gloss are observed for Inventive Example 1 over Comparative Example 3 and Comparative Example 4.

Film toughness data is also provided in Table 2. The data show that for both film thicknesses, 1.5 mil and 2 mil, the film structures having an alternating arrangement of layers comprising polymers (A) and (B) rather than a block or random arrangement of layers comprising polymers (A) and (B) have improved toughness properties. Inventive Example 1 has a puncture energy which is 33% higher than Comparative Example 1, 23% higher than Comparative Example 3, and 8% higher than Comparative Example 4, while Inventive Example 2 has a puncture energy which is 14% higher than Comparative Example 2. Similarly, Inventive Examples 1 and 2 both have higher dart impact values than Comparative Examples 1 and 2, at 28% and 34% higher respectively. Inventive Example 1 also had better dart impact values than Comparative Examples 3 and 4. Finally, when comparing the Dynatup maximum load values, it is clear that Inventive Examples 1 and 2 each have significantly higher values than Comparative Examples 1 and 2. Inventive Example 1 has a Dynatup maximum loading value which is 24% higher than Comparative Example 1, while Inventive Example 2 has a Dynatup maximum loading value which is 13% higher than that of Comparative Example 2. Inventive Example 1 also had better Dynatup maximum load values than Comparative Examples 3 and 4.

To assess the stiffness properties of the film structures, the 1% secant modulus was measured and the data are also presented in Table 2. When the machine direction (MD) 1% secant modulus is considered, there was little difference observed between films structures having an alternating arrangement of layers comprising polymers (A) and (B) and film structures having a block arrangement of layers comprising polymers (A) and (B). At both the 1.5 mil and the 2 mil thicknesses, the machine direction 1% secant modulus was essentially the same for Inventive Examples 1 and 2 and the Comparative Examples 1 and 2 (562 MPa for 1.5 mil thickness and 533 MPa for 2 mil thickness). However, when the transverse direction (TD) 1% secant modulus is considered, a small difference was observed between Inventive Examples 1 and 2 and Comparative Examples 1 and 2: in this case, the film structures having an alternating arrangement of layers comprising polymers (A) and (B) rather than a block arrangement of layers comprising polymers (A) and (B) have only slightly lower stiffness values. Inventive Example 1 has a TD 1% secant modulus of 747 MPa vs. Comparative Example 1 which has a TD 1% secant modulus of 757 MPa. Inventive Example 2 has a TD 1% secant modulus of 720 MPa vs. Comparative Example 2 which has a TD 1% secant modulus of 771 MPa.

When considered together, the data in Table 2 show that when a film structure is formulated with strictly alternating and adjacent layers comprising polymers (A) and (B) rather than with a block (or random) arrangement of layers comprising polymers (A) and (B), the film structure has significantly improved optical and toughness properties, while not negatively impacting the stiffness to a large degree. This results in an improved balance of stiffness, toughness and optics for the film structure.

With regard to the water vapor transmission rate (WVTR) and the oxygen transmission rate (OTR) data for the films structures, the data in Table 2 shows that a film structure having an alternating arrangement of layers comprising polymers (A) and (B) has slightly worse barrier properties than a film structure having a block arrangement of layers comprising polymers (A) and (B). However, the difference is not large, and ranges from 2 to 10% higher for Inventive Examples 1 and 2 vs. Comparative Examples 1 and 2 when both the WVTR and OTR are considered.

The curl direction and radius of curvature in the machine (MD) and transverse (TD) directions of the film structures are provided in Table 2. It was clear from simple visual inspection that the 1.5 mil and 2 mil film structures having an alternating arrangement of layers comprising polymers (A) and (B) had no significant curling in either of the MD or TD directions while the 1.5 and 2 mil film structures having a block arrangement of layers comprising polymers (A) and (B) showed severe curling in both the MD and TD directions. Indeed, for Inventive Examples 1 and 2, there was essentially no curl observed in either of the MD and TD directions, while for Comparative Example 1, the MD and TD curvature radii were 2 mm and 4 mm respectively, and for Comparative Example 2, the MD and TD curvature radii were 2 mm and 5 mm respectively.

The Modulated DSC profiles (the heat flow vs. temperature) for a 1.5 mil film structure having an alternating arrangement of layers comprising polymers (A) and (B), Inventive Example 1, and for a 1.5 mil film structure having a block arrangement of layers comprising polymers (A) and (B), Comparative Example 1, are shown in FIG. 1. The profiles are obtained from the modulated DSC final heating cycles. FIG. 1 clearly shows the presence of only a single melting peak at 127.8° C., for Inventive Example 1 which is a film structure having an alternating arrangement of layers comprising polymers (A) and (B), while two distinct melting peaks are observed, one at 126.0° C. and one at 131.1° C., for Comparative Example 1, which is a film structure having a block arrangement of layers comprising polymers (A) and (B).

Without wishing to be bound by theory, the presence of only a single melting peak for Inventive Example 1, is indicative of co-crystallization behavior which occurs at the interface between the linear low density polyethylene (A) and the high density polyethylene (B). With the alternating layers comprising polymer (A) and polymer (B), it appears that the layer comprising the higher density polyethylene is able to nucleate the layer comprising the lower density polyethylene, resulting in co-crystallization at their interface. This co-crystallization behavior is enhanced in the film structure having strictly alternating layers comprising polymers (A) and (B) because the number of adjacent interfaces between a lower and higher density polyethylene material is increased (relative to a film structure having a blocky nature) and there are more opportunities for the higher density material to nucleate the lower density material (i.e. co-crystallization effects are enhanced). As a result, a single peak is observed for Inventive Example 1 in FIG. 1, while two distinct peaks are observed for Comparative Example 1.

Because, co-crystallization phenomena is believed to be influenced by the melt miscibility (and the relative rates of crystallization) of the polymers used to make each layer in a blown film structure (during the blown film process), and because the melt miscibility and crystallization rates are believed to be determined, at least in part, by a polymer's branching content and branching distribution, the polymers (A) and (B) were further examined using TREF (temperature rising elution fractionation) analysis.

Figure 2:
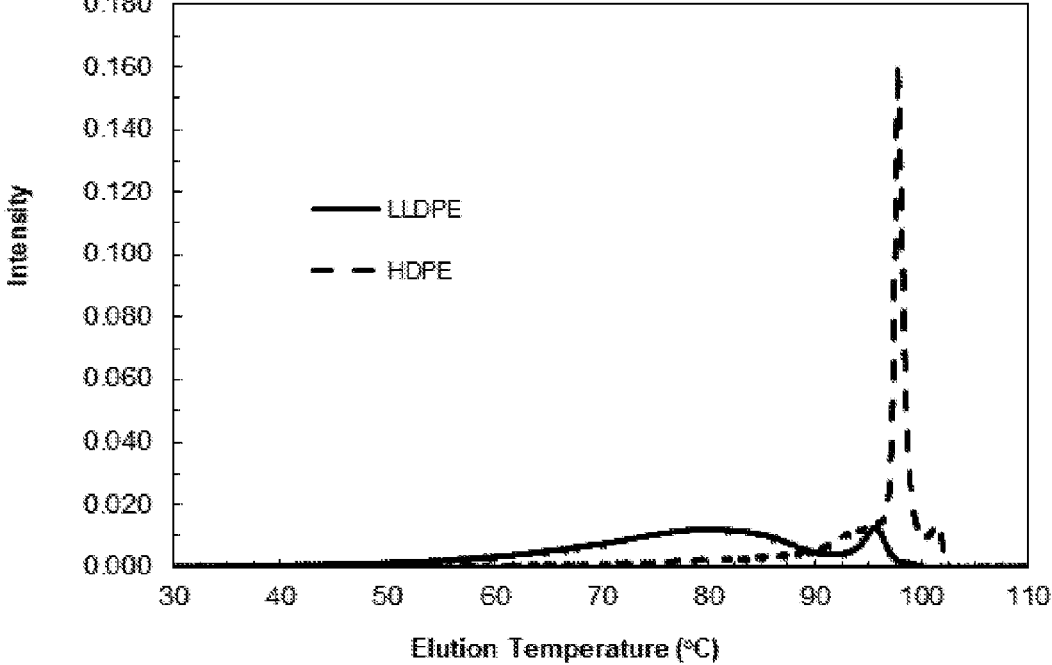
FIG. 2 shows the CTREF profiles for a linear low density polyethylene (LLDPE) and a high density polyethylene (HDPE).

FIG. 2 shows the CTREF profiles of polymer (A) which is a linear low density polyethylene (e.g. SCLAIR FPs120) and polymer (B) which is high density polyethylene (e.g. SURPASS HPs167).

Polymer (B), which is made with a single site catalyst, has a narrow composition distribution, with a large elution peak occurring at relatively high temperature. Polymer (A), which is made with a multi-site Ziegler-Natta catalyst, has a broad composition distribution, but includes higher density polymer chains which are eluted at higher temperatures and which, in the CTREF profile, partially overlap with those higher density polymer chains present in polymer (B). Without wishing to be bound by theory, it seems probable that the partial synergy in the comonomer distribution of polymers (A) and (B) as observed in the CTREF profiles promotes their co-crystallization, which is in agreement with the results obtained by modulated DSC, where a single peak was observed for the strictly alternating film structure (Inventive Example 1).

Non-limiting embodiments of the present disclosure include the following:

Embodiment A. An all polyethylene multilayer film structure, the film structure comprising at least five alternating and adjacent layers of:

(A) a linear low density polyethylene having a density of from 0.910 g/cm$^3$ to 0.940 g/cm$^3$ and a melt index, $I_2$ of from 0.1 to 10 g/10 min; and (B) a high density polyethylene having a density of at least 0.945 g/cm$^3$, a melt index, $I_2$ of from 0.1 to 10 g/10 min and comprising from 0 to 1 weight percent of a nucleating agent or a mixture of nucleating agents.

Embodiment B. The film structure of Embodiment A wherein the difference in density between the linear low density polyethylene (A) and the high density polyethylene (B) is at least 0.015 g/cm$^3$.

Embodiment C. The film structure of Embodiment A wherein the difference in density between the linear low density polyethylene (A) and the high density polyethylene (B) is at least 0.030 g/cm$^3$.

Embodiment D. The film structure of Embodiment A, B, or C wherein the high density polyethylene is a polyethylene homopolymer composition, the polyethylene homopolymer composition comprising:

(i) 95 to 30 weight percent of a first ethylene homopolymer having a density of from 0.950 to 0.975 g/cm$^3$; and (ii) 5 to 70 weight percent of a second ethylene homopolymer having a density of from 0.950 to 0.975 g/cm$^3$, wherein the ratio of the melt index, $I_2$ of the second ethylene homopolymer to the melt index, $I_2$ of the first ethylene homopolymer is at least 10.

Embodiment E. The film structure of Embodiment A, B, C, or D wherein the high density polyethylene comprises from 100 to 3,000 ppm of the nucleating agent or the mixture of nucleating agents.

Embodiment F. The film structure of Embodiment A, B, C, D, or E wherein the nucleating agent or the mixture of nucleating agents comprises a salt of a dicarboxylic acid.

Embodiment G. The film structure of Embodiment A, B, C, D, E or F having five alternating and adjacent layers in the following pattern: A/B/A/B/A.

Embodiment H. The film structure of Embodiment A, B, C, D, E or F having five alternating and adjacent layers in the following pattern: B/A/B/A/B.

Embodiment I. The film structure of Embodiment A, B, C, D, E or F having seven alternating and adjacent layers in the following pattern: A/B/A/B/A/B/A.

Embodiment J. The film structure of Embodiment A, B, C, D, E or F having seven alternating and adjacent layers in the following pattern: B/A/B/A/B/A/B.

Embodiment K. The film structure of Embodiment A, B, C, D, E or F having nine alternating and adjacent layers in the following pattern: A/B/A/B/A/B/A/B/A.

Embodiment L. The film structure of Embodiment A, B, C, D, E or F having nine alternating and adjacent layers in the following pattern: B/A/B/A/B/A/B/A/B.

Embodiment M. The film structure of Embodiment A, B, C, D, E or F having eleven alternating and adjacent layers in the following pattern: A/B/A/B/A/B/A/B/A/B/A.

Embodiment N. The film structure of Embodiment A, B, C, D, E or F having eleven alternating and adjacent layers in the following pattern: B/A/B/A/B/A/B/A/B/A/B.

Embodiment O. The film structure Embodiment A, B, C, D, E or F wherein the film structure has at least one skin layer comprising (A) a linear low density polyethylene having a density of from 0.910 g/cm$^3$ to 0.940 g/cm$^3$ and a melt index, $I_2$ of from 0.1 to 10 g/10 min.

INDUSTRIAL APPLICABILITY

Multilayer polymer film structures may be tailored for use in various packaging applications. Provided is an all polyethylene multilayer film structure having good inherent recyclability.

The invention claimed is:

1. An all polyethylene multilayer film structure, the film structure comprising at least five alternating and adjacent layers of:

(A) a linear low density polyethylene having a density of from 0.910 g/cm$^3$ to 0.940 g/cm$^3$ and a melt index, $I_2$ of from 0.1 to 10 g/10 min; and (B) a high density polyethylene having a density of at least 0.945 g/cm$^3$, a melt index, $I_2$ of from 0.1 to 10 g/10 min and comprising from 0 to 1 weight percent of a nucleating agent or a mixture of nucleating agents;

wherein the high density polyethylene is a polyethylene homopolymer composition, the polyethylene homopolymer composition comprising:

(i) 95 to 30 weight percent of a first ethylene homopolymer having a density of from 0.950 to 0.975 g/cm$^3$; and (ii) 5 to 70 weight percent of a second ethylene homopolymer having a density of from 0.950 to 0.975 g/cm$^3$, wherein the ratio of the melt index, $I_2$ of the second ethylene homopolymer to the melt index, $I_2$ of the first ethylene homopolymer is at least 10, wherein the multilayer film has three or more of:

a haze value as measured by ASTM D1003-13 of from 8% to 25%;

a gloss value as measured by ASTM D2457-13 at 45 degrees of greater than 45;

a puncture energy as measured by ASTM D5748-95 of from 50 to 90 J/mm;

a Dynatup maximum load measured at ASTM conditions of from 4.5 to 10.0 lb;

a transverse direction (TD) curvature radius of greater than 25 mm; or a machine direction (MD) curvature radius of greater than 25 mm; and wherein the film exhibits:

a machine direction (MD) 1% secant modulus as determined by ASTM D882-12 of from 400 MPa to 700 MPa;

a transverse direction (TD) 1% secant modulus as determined by ASTM D882-12 of from 500 MPa to 900 MPa;

an oxygen transmission rate (OTR) of from 25 to 100 cm$^3$ per 100 inches$^2$ per 24 hours; and a water vapor transmission rate (WVTR) as measured by ASTM F1249-90 of from 0.04 to 0.24 grams per 100 inches$^2$ per 24 hours.

2. The film structure of claim 1 wherein the difference in density between the linear low density polyethylene (A) and the high density polyethylene (B) is at least 0.015 g/cm$^3$.

3. The film structure of claim 1 wherein the difference in density between the linear low density polyethylene (A) and the high density polyethylene (B) is at least 0.030 g/cm$^3$.

4. The film structure of claim 1 wherein the high density polyethylene comprises from 100 to 3000 ppm of the nucleating agent or the mixture of nucleating agents.

5. The film structure of claim 4 wherein the nucleating agent or the mixture of nucleating agents comprises a salt of a dicarboxylic acid compound.

6. The film structure of claim 1 having five alternating and adjacent layers in the following pattern: A/B/A/B/A.

7. The film structure of claim 1 having five alternating and adjacent layers in the following pattern: B/A/B/A/B.

8. The film structure of claim 1 having seven alternating and adjacent layers in the following pattern: A/B/A/B/A/B/A.

9. The film structure of claim 1 having seven alternating and adjacent layers in the following pattern: B/A/B/A/B/A/B.

10. The film structure of claim 1 having nine alternating and adjacent layers in the following pattern: A/B/A/B/A/B/A/B/A.

11. The film structure of claim 1 having nine alternating and adjacent layers in the following pattern: B/A/B/A/B/A/B/A/B.

12. The film structure of claim 1 having eleven alternating and adjacent layers in the following pattern: A/B/A/B/A/B/A/B/A.

13. The film structure of claim 1 having eleven alternating and adjacent layers in the following pattern: B/A/B/A/B/A/B/A/B.

14. The film structure of claim 1 wherein the film structure has at least one skin layer comprising (A) a linear low density polyethylene having a density of from 0.910 g/cm$^3$ to 0.940 g/cm$^3$ and a melt index, I$_2$ of from 0.1 to 10 g/10 min.

\* \* \* \* \*